US009962657B2

(12) United States Patent
Ahn et al.

(10) Patent No.: US 9,962,657 B2
(45) Date of Patent: May 8, 2018

(54) METHOD OF AND SYSTEM FOR SEPARATING VOLATILE SILOXANE FROM FEED MIXTURE

(71) Applicant: Dow Corning Corporation, Midland, MI (US)

(72) Inventors: Dongchan Ahn, Midland, MI (US); James Thompson, Sanford, MI (US)

(73) Assignee: DOW CORNING CORPORATION, Midland, MI (US)

( * ) Notice: Subject to any disclaimer, the term of this patent is extended or adjusted under 35 U.S.C. 154(b) by 120 days.

(21) Appl. No.: 15/124,048

(22) PCT Filed: Dec. 5, 2014

(86) PCT No.: PCT/US2014/068691
§ 371 (c)(1),
(2) Date: Sep. 7, 2016

(87) PCT Pub. No.: WO2015/147920
PCT Pub. Date: Oct. 1, 2015

(65) Prior Publication Data
US 2017/0021307 A1    Jan. 26, 2017

Related U.S. Application Data

(60) Provisional application No. 61/970,040, filed on Mar. 25, 2014.

(51) Int. Cl.
*B01D 61/36* (2006.01)
*B01D 71/70* (2006.01)
*B01D 63/02* (2006.01)

(52) U.S. Cl.
CPC .......... *B01D 61/362* (2013.01); *B01D 63/02* (2013.01); *B01D 71/70* (2013.01);
(Continued)

(58) Field of Classification Search
None
See application file for complete search history.

(56) References Cited

U.S. PATENT DOCUMENTS 5,464,917 A    11/1995   Kishita et al.
5,753,008 A     5/1998   Friesen et al.
(Continued)

FOREIGN PATENT DOCUMENTS

JP    2002-194288    7/2002
WO    2008024329 A1  2/2008

OTHER PUBLICATIONS

Marc Ajhar et al: "Siloxane removal using silicone-rubber membranes", Separation and Purification Technology, Elsevier Science, Amsterdam, NL, vol. 4 89, Jan. 3, 2012 (Jan. 3, 2012), pp. 234-244.
(Continued)

*Primary Examiner* — Chester T Barry
(74) *Attorney, Agent, or Firm* — Matthew T. Fewkes

(57) ABSTRACT

Various embodiments disclosed relate to methods of separating a volatile siloxane from a liquid mixture. In various embodiments, the method includes contacting a first side of a first hydrophobic membrane with a liquid feed mixture including a polymer and at least one volatile siloxane. The method can also include contacting a second side of the membrane with a sweep medium including at least one of a sweep gas, a sweep liquid, and a vacuum, to produce a permeate mixture on the second side of the membrane and a retentate mixture on the first side of the membrane, wherein the permeate mixture is enriched in the volatile siloxane, and the retentate mixture is depleted in the volatile siloxane.

15 Claims, 3 Drawing Sheets

(52) U.S. Cl.
CPC ...... *B01D 2311/13* (2013.01); *B01D 2325/04* (2013.01); *B01D 2325/38* (2013.01)

(56) References Cited

U.S. PATENT DOCUMENTS

| | | | |
|---|---|---|---|
| 5,843,209 A * | 12/1998 | Ray | B01D 53/22 95/45 |
| 7,314,565 B2 | 1/2008 | Sabottke et al. | |
| 7,365,220 B2 * | 4/2008 | Lewis | C07F 7/025 556/482 |
| 7,423,192 B2 | 9/2008 | Sabottke et al. | |
| 7,479,567 B2 | 1/2009 | Gammie et al. | |
| 2002/0165505 A1 * | 11/2002 | Gee | B01D 61/364 604/289 |
| 2006/0000352 A1 | 1/2006 | Tower et al. | |
| 2008/0210540 A1 * | 9/2008 | Dieterle | B01D 3/14 203/19 |
| 2010/0122552 A1 | 5/2010 | Schwartz et al. | |
| 2015/0190747 A1 | 7/2015 | Ahn et al. | |

OTHER PUBLICATIONS

JP2002194288 Machine Translation, Dow Corning Toray Silicone, Jul. 10, 2002, Film-Forming Silicone Resin Composition and Its Manufacturing Method.

* cited by examiner

METHOD OF AND SYSTEM FOR SEPARATING VOLATILE SILOXANE FROM FEED MIXTURE

CROSS REFERENCE TO RELATED APPLICATIONS

This application is a U.S. national stage filing under 35 U.S.C. § 371 of PCT Application No. PCT/US14/068691 filed on 5 Dec. 2014, currently pending, which claims the benefit of U.S. Patent Application No. 61/970,040 filed 25 Mar. 2014 under 35 U.S.C. § 119 (a)-(d) and 35 U.S.C. § 365(a). PCT Application No. PCT/US14/068691 and Patent Application No. 61/970,040 are hereby incorporated by reference.

BACKGROUND OF THE INVENTION

Various reactions form volatile siloxanes as desired materials or side-products. Purification of the desired product requires separation of the volatile siloxanes from a mixture of the volatile siloxanes and the other reaction products. However, removal of volatile siloxanes from a mixture can involve harsh temperature conditions, such as using pot stripping or wiped film evaporators, that degrade components of the mixture.

SUMMARY OF THE INVENTION

In various embodiments, the present invention provides a method of removing a volatile siloxane from a liquid mixture. The method includes contacting a first side of a first hydrophobic membrane with a liquid feed mixture. The liquid feed mixture includes a polymer and at least one volatile siloxane. The method also includes contacting a second side of the membrane with a sweep medium. The sweep medium includes at least one of a sweep gas, a sweep liquid, and a vacuum. The contacting of the first side with the feed mixture and the second side with the sweep medium produces a permeate mixture on the second side of the membrane and a retentate mixture on the first side of the membrane. The permeate mixture is enriched in the volatile siloxane. The retentate mixture is depleted in the volatile siloxane.

In various embodiments, the present invention provides a method of removing a volatile siloxane from a liquid mixture. The method includes contacting a first side of a first hydrophobic membrane with a liquid feed mixture including a polymer and at least one volatile siloxane. The feed mixture is free of an organopolysiloxane emulsion. The first hydrophobic membrane includes a dense silicone membrane having a thickness of about 1 μm to about 300 μm. The liquid feed mixture has a temperature of about −40° C. to about 250° C. The method also includes contacting a second side of the membrane with a sweep medium including at least one of a sweep gas, a sweep liquid, and a vacuum, to produce a permeate mixture on the second side of the membrane and a retentate mixture on the first side of the membrane. The permeate mixture is enriched in the volatile siloxane, and the retentate mixture is depleted in the volatile siloxane by about 40 wt % to about 99 wt %, as compared to the liquid feed mixture.

In various embodiments, the present invention provides a system for separating a volatile siloxane from a liquid mixture. The system includes a first hydrophobic membrane. The system includes a liquid feed mixture including a polymer and at least one volatile siloxane, the liquid feed mixture contacting a first side of the first hydrophobic membrane. The system includes a sweep medium including at least one of a sweep gas, a sweep liquid, and a vacuum, the sweep medium contacting a second side of the membrane. The system includes a permeate mixture on the second side of the membrane, the permeate mixture formed by the contacting of the first side with the feed mixture and the second side with the sweep medium, wherein the permeate mixture is enriched in the volatile siloxane. The system includes a retentate mixture on the first side of the membrane, the retentate mixture formed by the contacting of the first side with the feed mixture and the second side with the sweep medium, wherein the retentate mixture is depleted in the volatile siloxane.

Various embodiments provide certain advantages over other separation methods, some of which are surprising and unexpected. The sweep medium, such as at least one of a gas, liquid, and a vacuum, can provide enhanced flux of the volatile siloxane component desired to be separated through the membrane. In various embodiments, the method of the present invention can be utilized to efficiently remove volatile siloxanes, including cyclosiloxanes and linear siloxanes, from a liquid feed mixture. Compared to conventional methods of stripping volatile siloxanes, in various embodiments, the present method can be carried out under relatively mild conditions by controlling such parameters as module temperature, feed pressure, permeate pressure, sweep liquid temperature, and feed mixture flow rate, thus causing less degradation of the mixture than other methods including harsher temperatures. In some embodiments, by using a nonporous or dense membrane, less leakage of a sweep liquid occurs, and less clogging of the membrane can occur, as compared to porous or microporous membranes having pores passing all the way through the membrane, thus providing a clog and leak resistant membrane system requiring less maintenance and having superior separation abilities including greater efficiency and greater degree of separation. In various embodiments, the small footprint and modularity of the membrane process affords greater volumetric efficiency or reliability than batch operations such as pot stripping, rotary evaporators, and continuous or semi-continuous operations such as wiped film evaporators that require more moving parts. In some embodiments, by using a dense unsupported membrane, the absence of pores in a porous support contributes to less fouling and less mass transfer resistance from condensation of absorbates in the pores of the support. In various embodiments, the method of the present invention can remove volatile siloxanes from a mixture at least one of under more mild processing conditions and more efficiently than other processes, for example, using less energy, using less time, or with lower cost.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
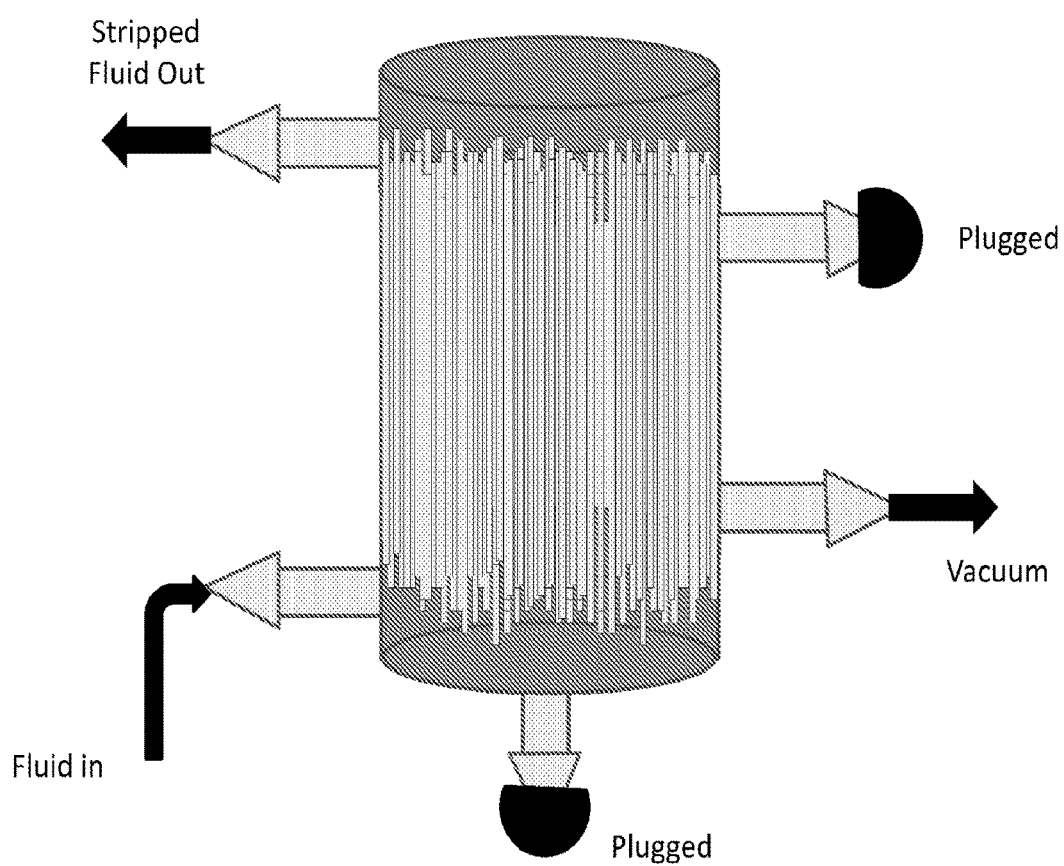
FIG. 1 illustrates a hollow fiber module for bore-side stripping, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH═CH($CH_3$), —CH═C($CH_3$)$_2$, —C($CH_3$)═$CH_2$, —C($CH_3$)═CH($CH_3$), —C($CH_2CH_3$)═$CH_2$, cyclohexenyl, cyclopentenyl, cyclohexadienyl, butadienyl, pentadienyl, and hexadienyl among others.

The term "resin" as used herein refers to polysiloxane material of any viscosity that includes at least one siloxane monomer that is bonded via a Si—O—Si bond to three or four other siloxane monomers. In one example, the polysiloxane material includes T or Q groups, as defined herein.

The term "radiation" as used herein refers to energetic particles travelling through a medium or space. Examples of radiation are visible light, infrared light, microwaves, radio waves, very low frequency waves, extremely low frequency waves, thermal radiation (heat), and black-body radiation.

The term "cure" as used herein refers to exposing to radiation in any form, heating, or allowing to undergo a physical or chemical reaction that results in hardening or an increase in viscosity.

The term "dense" as used herein with regard to membranes refers to a liquid material being unable to pass through the membrane without making a phase transition to the gas phase. A dense membrane can be substantially nonporous.

The term "pore" as used herein refers to a depression, slit, or hole of any size or shape in a solid object. A pore can run all the way through an object. A pore can intersect other pores.

The term "nonporous" as used herein with regard to membranes refers to the membrane having substantially no pores that form paths that penetrate all the way through the thickness of the membrane from one major side to the other major side, unless otherwise indicated.

The term "free-standing" or "unsupported" as used herein refers to a membrane with the majority of the surface area on each of the two major sides of the membrane not contacting a substrate, whether the substrate is porous or not. In some embodiments, a membrane that is "free-standing" or "unsupported" can be 100% not supported on both major sides. A membrane that is "free-standing" or "unsupported" can be supported at the edges or at the minority (e.g., less than about 50%) of the surface area on either or both major sides of the membrane.

The term "supported" as used herein refers to a membrane with the majority of the surface area on at least one of the two major sides contacting a substrate, whether the substrate is porous or not. In some embodiments, a membrane that is "supported" can be 100% supported on at least one side. A membrane that is "supported" can be supported at any suitable location at the majority (e.g., more than about 50%) of the surface area on either or both major sides of the membrane.

The term "enrich" as used herein refers to increasing in quantity or concentration, such as of a liquid, gas, or solute. For example, a mixture of gases A and B can be enriched in gas A if the concentration or quantity of gas A is increased, for example by selective permeation of gas A through a membrane to add gas A to the mixture, or for example by selective permeation of gas B through a membrane to take gas B away from the mixture. When a first gas component moves across a membrane into a fluid on the other side, the fluid is enriched in the first gas component, and the combination of the fluid and the gas that permeated the membrane can be referred to as the permeate.

The term "deplete" as used herein refers to decreasing in quantity or concentration, such as of a liquid, gas, or solute. For example, a mixture of gases A and B can be depleted in gas B if the concentration or quantity of gas B is decreased, for example by selective permeation of gas B through a membrane to take gas B away from the mixture, or for example by selective permeation of gas A through a membrane to add gas A to the mixture.

The term "selectivity" or "ideal selectivity" as used herein refers to the ratio of permeability of the faster permeating gas over the slower permeating gas, measured at the same temperature (assumed to be room temperature unless otherwise specified).

The term "permeability" as used herein refers to the permeability coefficient ($P_x$) of substance X through a membrane, where $q_{mx}=P_x*A*\Delta p_x*(1/\delta)$, where $q_{mx}$ is the volumetric flow rate of substance X through the membrane, A is the surface area of one major side of the membrane through which substance X flows, $\Delta p_x$ is the difference of the partial pressure of substance X across the membrane, and $\delta$ is the thickness of the membrane. $P_x$ can also be expressed as $V \cdot \delta/(A \cdot t \cdot \Delta p)$, wherein $P_x$ is the permeability for a gas X in the membrane, V is the volume of gas X which permeates through the membrane, $\delta$ is the thickness of the membrane, A is the area of the membrane, t is time, $\Delta p$ is the pressure difference of the gas X at the retente and permeate side.

The term "Barrer" or "Barrers" as used herein refers to a unit of permeability, wherein 1 Barrer=$10^{-11}$ ($cm^3$ gas) cm $cm^{-2}$ $s^{-1}$ $mmHg^{-1}$, or $10^{-10}$ ($cm^3$ gas) cm $cm^{-2}$ $s^{-1}$ cm $Hg^{-1}$, where "$cm^3$ gas" represents the quantity of the gas that would take up one cubic centimeter at standard temperature and pressure.

The term "total surface area" as used herein with respect to membranes refers to the total surface area of the side of the membrane exposed to the feed mixture.

The term "air" as used herein refers to a mixture of gases with a composition approximately identical to the native composition of gases taken from the atmosphere, generally at ground level. In some examples, air is taken from the ambient surroundings. Air has a composition that includes approximately 78% nitrogen, 21% oxygen, 1% argon, and 0.04% carbon dioxide, as well as small amounts of other gases.

The term "room temperature" as used herein refers to ambient temperature, which can be, for example, between about 15° C. and about 28° C.

The term "gas" as used herein includes vapor phase materials.

The term "absorption" or "absorb" as used herein refers to dissolving or carrying an absorbed component. For example, a fluid can absorb a gas as at least one of a dissolved gas, and as bubbles of any suitable size such as to allow transport of the gas in the fluid. An absorption process can include any suitable mechanism, such as chemical interactions (e.g., chemisorption), physical interactions (e.g., physisorption), bulk interactions, surface interactions (e.g., adsorption), or combinations thereof.

The term "desorption" or "desorb" as used herein refers to ejecting an absorbed component.

Method of Separating Volatile Siloxanes from a Liquid Mixture.

Various embodiments provide a method of separating a volatile siloxane from a liquid mixture. The method can include contacting a first side of a first hydrophobic membrane with a liquid feed mixture including a polymer and at least one volatile siloxane. The method can also include contacting a second side of the membrane with a sweep medium including at least one of a sweep gas, a sweep liquid, and a vacuum. The contacting of the feed mixture with the first side of the membrane and the contacting of the sweep medium with the second side of the membrane can produce a permeate mixture on the second side of the membrane and a retentate mixture on the first side of the membrane, wherein the permeate mixture is enriched in the volatile siloxane, and the retentate mixture is depleted in the volatile siloxane.

In various embodiments, the method provides a more energy efficient, convenient, and mild means to remove volatile siloxanes than known methods such as pot stripping and wiped film evaporators. In one embodiment, the membrane is a dense silicone hollow fiber membrane, and the feed fluid is a mixture of an organopolysiloxane polymer with a volatile linear or cyclosiloxanes. In some embodiments, the method can provide effective reduction in the volatile components at a lower temperature or vacuum level than in a bulk stripping operation. In some embodiments, a sweep medium such as a silicone fluid can be used to sweep the shell-side or bore-side of a hollow fiber membrane module to remove the volatile siloxanes from another liquid. The sweep liquid can then be regenerated for re-use through the use of a second module or desorption module. In some embodiments, the volatile components can then be desorbed from the silicone sweep fluid using a higher temperature than used during the absorption, optionally without the use of a vacuum pump. In some embodiments including absorption and desorption, the absorption can be performed with at least one of a colder temperature of the sweep fluid and a lower pressure of the sweep fluid, while during desorption at least one of a higher temperature of the sweep fluid and a higher pressure of the sweep fluid is used. In some embodiments, the sweep fluid is recirculated for reabsorption without being desorbed (e.g., multiple passes). In some embodiments, the sweep fluid containing the sorbed volatile siloxanes is not regenerated but sent to another process or stored for future use. In some embodiments, the method can be used to strip ring-opening equilibration products, or can be used to recover cyclosiloxanes from a variety of wastestreams.

The method can separate one or more than one volatile siloxane from the liquid feed mixture. The removal can include decreasing the concentration of a volatile siloxane in the feed mixture, or the removal can include the removal of substantially all of a volatile siloxane from the feed mixture. In some embodiments, substantially all of one volatile siloxane is removed, while only part of another volatile siloxane is removed. In some embodiments, the concentration of one volatile siloxane can be decreased by a first amount, while the concentration of another volatile siloxane can be decreased by a second amount that is the same or different than the first amount. The method can remove any suitable amount of the one or more volatile siloxanes from the feed mixture. In some examples, the retentate mixture is depleted in the one or more volatile siloxanes by about 1 wt % to about 99.9 wt %, as compared to the liquid feed mixture, about 40 wt % to about 99 wt %, about 70 wt % to about 95 wt %, or about 1 wt % or less, 2 wt %, 3, 4, 5, 10, 15, 20, 25, 30, 35, 40, 45, 50, 55, 60, 65, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5 wt %, or about 99.9 wt % or more.

The present invention provides methods of using a membrane in combination with a sweep medium. The sweep medium can be contacted to the permeate side of a membrane to help sweep away some or substantially all of one or more volatile siloxanes that permeate through the membrane into the permeate side, thus helping maintain a strong driving force for mass transfer of the first component across the membrane. The liquid feed mixture on one side of the membrane and the sweep medium on the other side of the membrane can have any suitable flow configuration with respect to one another. The movement of the feed mixture and sweep medium with respect to one another can lessen the concentration of the volatile siloxane immediately adjacent the membrane, which can increase the rate of transfer of the volatile siloxane across the membrane. By moving the feed mixture and sweep medium with respect to one another, the amount of the feed mixture and sweep medium contacting the membrane over a given time can be increased or maximized, which can improve the separation performance of the membrane by increasing or optimizing the transfer of the volatile siloxane across the membrane. In some examples, the feed mixture and sweep medium flow in similar directions. In other examples, the feed mixture and sweep medium flow in at least one of countercurrent or crosscurrent flow. Flow configurations can include multiple flow patterns, for example about 10, 20 30, 40, 50, 60, 70, 80, or 90% of the feed mixture and sweep medium can have a crosscurrent flow while the other about 90, 80, 70, 60, 50, 40, 30, 20, or 10% of the feed mixture and sweep medium have a countercurrent flow, a similar flow direction (e.g., co-current flow), or a radial flow direction with respect to one another (e.g., bore flow along length while sweep flow is along a radial direction). Any suitable combination of flow patterns is encompassed within embodiments of the present invention. The flow rate of the feed mixture on one side of a membrane, and the flow rate of the sweep medium on the other side of the membrane can be varied independently to give any suitable feed mixture to sweep medium flow ratio for a membrane system. There can be an optimum range of feed mixture to sweep medium flow ratios to accomplish a desired separation for a given membrane system, configuration and operating conditions. When a sweep liquid is used to assist in removal of a volatile siloxane from a feed mixture, the optimal feed mixture to sweep liquid flow ratio can be different from the optimal ratio for a process where the volatile siloxane is removed from the feed mixture into a sweep medium.

The feed mixture can be contacted to the membrane (e.g., one or more membranes) in any suitable fashion. In some embodiments, the feed mixture can be allowed to contact the membrane at a pressure such that there is a positive gradient in partial pressure of the at least one volatile siloxane across the membrane to drive the permeation of the at least one volatile siloxane into the permeate side of the membrane. In one example, the feed mixture is allowed to contact the membrane at approximately ambient pressure. In another example, both the feed mixture/retentate side and the permeate side are kept near ambient pressure, but a sweep fluid or gas introduced to the permeate side has a pressure and flow rate such that a positive partial pressure gradient of the volatile siloxane is maintained. In another example, the feed mixture is allowed to contact the membrane such that a pressure difference between the first and second sides of the membrane occurs. The pressure difference can be such that the pressure of the feed mixture (on the first side of the membrane) is greater than the pressure at the second side of the membrane. In one example, the pressure difference is caused by the pressure of the feed mixture being at above ambient pressure; in such examples, the pressure of the feed mixture can be raised above ambient pressure using any suitable means, such as with a pump. In another example, the pressure difference is caused by the pressure at the second side of the membrane being at or below ambient pressure; in such examples, the pressure of the second side of the membrane can be reduced below ambient pressure using any suitable device such as a blower or vacuum pump. In other examples, a combination of lower than ambient pressure at the second side of the membrane, and higher than ambient pressure at the first side of the membrane, contributes to the pressure difference across the membrane. In some embodiments, a higher than ambient pressure on the first side of the membrane can be achieved by pumping feed mixture to the first side of the membrane and restricting the exit pathway of the retentate mixture from the membrane.

The method for separating one or more volatile siloxanes from a feed mixture includes contacting a second side of the membrane with a sweep medium. The contacting of the second side of the membrane with the sweep medium and the first side of the membrane with the feed mixture produces a permeate mixture on the second side of the membrane and a retentate mixture on the first side of the membrane. The permeate mixture is enriched in the volatile siloxane; the sweep medium has at least one of a higher concentration or a greater quantity of the volatile siloxane therein after being contacted with the membrane as compared to the concentration before being contacted with the membrane. The retentate mixture is depleted in the volatile siloxane; the feed mixture has at least one of a lower concentration or a smaller quantity of the volatile siloxane therein after being contacted with the membrane as compared to the concentration or quantity of the volatile siloxane before being contacted with the membrane (as the feed mixture).

In some embodiments, the temperature of the feed mixture can be adjusted to provide a desired degree of separation, depending on the nature of the sweep medium and the membrane. The temperature of the feed mixture can be any suitable temperature, such as about room temperature to about 150° C., about −40° C. to about 250° C., about 30° C. to about 150° C., about 40° C. to about 110° C., about 50° C. to about 90° C., or about room temperature, or about −40° C. or less, or about −35° C., −30, −25, −20, −15, −10, −5, 0, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 170, 180, 190, 200, 210, 220, 230, 240° C., or about 250° C. or more. In some embodiments, the sweep medium can be introduced to the second side of the membrane at a favorable temperature and pressure to achieve a more rapid transfer of the one or more volatile siloxanes from the fluid into the sweep medium, e.g., to increase the flux of the one or more volatile siloxanes across the membrane. The sweep medium can be any suitable temperature during the contacting, such as about −60° C. to about 150° C., about −30° C. to about 150° C., about −20° C. to about 150° C., about −10° C. to about 150° C., about 0° C. to about 150° C., about 10° C. to about 150° C., about 20° C. to about 150° C., about 10° C. to about 110° C., about 10° C. to about 90° C., or about −60° C. or less, or about −55° C., −50, −45, −40, −35, −30, −25, −20, −15, −10, −5, 0, 5, 10, 15, 20, 25, 30, 40, 50, 55, 60, 65, 70, 75, 80, 85, 90, 95, 100, 105, 110, 115, 120, 125, 130, 135, 140, 145° C., or about 150° C. or more.

The feed mixture can have any suitable pressure during the contacting with the first side of the membrane. For example, the pressure of the feed mixture can be 0.01 bar to about 100,000 bar, or about 0.5 bar to about 5 bar, or about 0.01 bar or less, 0.05, 0.1, 0.2, 0.4, 0.6, 0.8, 1.0, 1.2, 1.4, 1.6, 1.8, 2, 2.5, 3, 3.5, 4, 4.5, 5, 6, 7, 8, 9, 10, 12, 14, 16, 18, 20, 25, 30, 40, 50, 75, 100, 150, 200, 250, 500, 750, 1,000, 1,500, 2,500, 5,000, 10,000, 50,000, or about 100,000 bar or more. The sweep medium can have any suitable pressure during the contacting with the first side of the membrane. For example, the pressure of the sweep medium can be about 0.000.01 bar to about 100 bar, or about 0.001 bar to about 10 bar, or about 0.000.01 bar or less, about 0.000.1 bar, 0.001, 0.01, 0.1, 0.2, 0.4, 0.6, 0.8, 1.0, 1.2, 1.4, 1.6, 1.8, 2, 2.5, 3, 3.5, 4, 4.5, 5, 6, 7, 8, 9, 10, 12, 14, 16, 18, 20, 25, 30, 40, 50, 75, or about 100 bar or more. The pressure differential between the feed mixture and the sweep medium can be any suitable pressure differential, such that the method can be carried out as described herein. For example, the pressure differential between the feed mixture and the sweep medium can be about 0, about 0.000.01 bar to about 100,000 bar, or about 0.01 bar to about 10,000 bar, or about 0.000.01 bar or less, about 0.000.1 bar, 0.001, 0.01, 0.1, 0.2, 0.4, 0.6, 0.8, 1.0, 1.2, 1.4, 1.6, 1.8, 2, 2.5, 3, 3.5, 4, 4.5, 5, 6, 7, 8, 9, 10, 12, 14, 16, 18, 20, 25, 30, 40, 50, 75, 100, 150, 200, 250, 500, 750, 1,000, 1,500, 2,500, 5,000, 10,000, 50,000, or about 100,000 bar or more.

In some examples, if the concentration of the volatile siloxane component at the second side of the membrane is allowed to reach certain levels, the rate of separation of the volatile siloxane component from the feed mixture can be decreased. The flow rate of the feed mixture and the sweep medium can be adjusted such that efficient and effective separation of the one or more volatile siloxanes occurs. For example, the flow rate of the feed mixture can be about 0.001 L/min to about 100,000 L/min, about 0.1 L/min to about 100 L/min, or about 0.001 L/min or less, 0.01 L/min, 0.1, 1, 2, 4, 6, 8, 10, 15, 20, 25, 50, 75, 100, 150, 200, 250, 500, 750, 1,000, 1,500, 2,500, 5,000, 7,500, 10,000, 15,000, 20,000, 25,000, 50,000, 75,000, or about 100,000 L/min or more. The flow rate of the sweep medium can be 0.001 L/min to about 100,000 L/min, about 0.1 L/min to about 100 L/min, or about 0.001 L/min or less, 0.01 L/min, 0.1, 1, 2, 4, 6, 8, 10, 15, 20, 25, 50, 75, 100, 150, 200, 250, 500, 750, 1,000, 1,500, 2,500, 5,000, 7,500, 10,000, 15,000, 20,000, 25,000, 50,000, 75,000, or about 100,000 L/min or more.

In some embodiments, the method for removing a volatile siloxane from a feed mixture can also include removing the one or more volatile siloxanes from the permeate mixture provided by the contacting, by at least one of decreasing the concentration or quantity of the one or more volatile siloxanes in the permeate mixture. Thus, the present invention can provide a combination of removing at least one volatile siloxane from a feed mixture using a sweep medium and removing the at least one volatile siloxane from the used sweep medium such as by use of a second membrane or via another suitable means. The method can further include recirculating the restored sweep medium permeate into contact with the second side of the membrane, allowing reuse of the sweep medium, such as by recirculating the desorbed permeate mixture into contact with the second side of the first hydrophobic membrane. Such reuse can enhance efficiency of the separation of the one or more volatile siloxanes from the feed mixture, and can occur for multiple cycles (e.g., about 2, 3, 4, 5, 10, 100, 1000, or more cycles). Desorbing the one or more volatile siloxanes can include contacting a first side of a second hydrophobic membrane with the permeate mixture and contacting a second side of the second hydrophobic membrane with a sweep medium. The sweep medium used in the second process can be the same as or different from the sweep medium used in the first process. In some embodiments, the sweep medium is not recycled.

Feed Mixture and Volatile Siloxane.

The liquid feed mixture can be any suitable feed mixture that at least includes at least one volatile siloxane and at least one polymer. The feed mixture can be a composition formed by a one or more chemical reactions that form the polymer, wherein at least one of the one or more volatile siloxanes are desired products or wherein at least one of the one or more volatile siloxanes are side-products. The feed mixture can include one polymer or more than one polymer. The polymer can be any suitable polymer, such as a polymer including silicon, such as a polysiloxane, such as an organopolysiloxane. The polymer can be any polymer including silicon described herein.

The feed mixture can include one or more organopolysiloxanes. The organopolysiloxane can have a linear, branched, cyclic, or resinous structure. The organopolysiloxane can be a homopolymer or a copolymer. The organopolysiloxane compound can be a disiloxane, trisiloxane, or polysiloxane. In some embodiments, the polymer is an alkyl-substituted, aryl-substituted, haloalkyl substituted, haloaryl-substituted or H-substituted organopolysiloxane, such as polydimethylsiloxane, polymethylhydridosiloxane, polymethylvinylsiloxane, polymethylphenylsiloxane, polydiphenylsiloxane, and copolymers thereof. The organopolysiloxane can be substituted with any suitable organic functional group or substituent, or with an organic polymer or organic oligomer, such as various structures of silicone-organic copolymers.

In various embodiments, an organopolysiloxane can include a compound of the formula

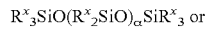

or

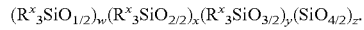

The variable α can have an average value of about zero or greater, and up to about 1,000,000. $0 \leq w < 0.95$, $0 \leq x < 1$, $0 \leq y < 1$, $0 \leq z < 0.95$, and $w+x+y+z \approx 1$. Each $R^x$ is independently a monovalent functional group, such as —H, substituted or unsubstituted $(C_1-C_{20})$alkyl (e.g., methyl, ethyl, propyl, pentyl, octyl, undecyl, octadecyl), substituted or unsubstituted $(C_6-C_{20})$aryl (e.g., phenyl, tolyl, xylyl, benzyl, 2-phenylethyl), substituted or unsubstituted $(C_2-C_{20})$alkenyl, halogen, $(C_{1-20})$alkoxy, vinyl, allyl, hexenyl, substituted or unsubstituted $(C_2-C_{20})$alkynyl, halogen-substituted $(C_{1-20})$alkyl or $(C_6-C_{20})$aryl (e.g., trifluoropropyl), hydroxyl, alkoxy, heteroaryl, substituted and unsubstituted cycloalkyl. Each Rx may also be an organic group, or a group of formula $R^y$-Q, wherein Q comprises an organic group such as carboxy, halogen, substituted or unsubstituted amine (primary, secondary or tertiary), vinyl, allyl, anhydride, mercapto, acrylate, methacrylate, acrylamide, oligoether, polyether, isocyanate, epoxy, cycloepoxy, hydroxyl, halogen, carboxylate, anhydride, isocyanate, sulfide, and naturally occurring or biologically derived groups (e.g., saccharides, peptides, celluloses), an ionic group (e.g., ammonium), cyano$(C_1-C_{20})$alkyl (e.g., cyanoethyl group, a cyanopropyl), and substituted or unsubstituted $(C_1-C_{20})$ hydrocarbyl interrupted or terminated with 0, 1, 2, or 3 groups selected from —O—, —NH—, and —S—. The variable $R^y$ is independently a divalent spacer that is a substituted or unsubstituted alkylene group of 1 to 12 carbon atoms or a group of formula $(R^9O)_p$, where $R^9$ is a divalent organic group such as an alkylene group of 1 to 12 carbon atoms, subscript p is an integer ranging from 1 to 50, and each $R^9O$ may be the same or different. In some examples, $R^y$ is methylene, ethylene, or propylene.

The variable $R^x$ can also each independently include other organic functional groups such as glycidyl, amine, ether, cyanate ester, isocyano, ester, alkoxy, acyloxy, carboxylic acid, carboxylate salt, succinate, anhydride, mercapto, sulfide, ketoxime, azide, phosphonate, phosphine, masked isocyano, hydroxyl, and combinations thereof. The variable $R^x$ can also include cycloalkyl groups including, but not limited to, a cyclohexyl group. The variable $R^x$ can an alkyloxypoly (oxylalkylene) group such as propyloxypoly(oxyethylene), propyloxypoly(oxypropylene), propyloxy-poly(oxypropylene)-co-poly(oxyethylene), halogen substituted versions thereof, and combinations thereof. The variable $R^x$ can include a halogenated hydrocarbon group including, but not limited to, 3,3,3-trifluoropropyl, 3-chloropropyl, dichlorophenyl, and 6,6,6,5,5,4,4,3,3-nonafluorohexyl groups, and combinations thereof. The variable $R^x$ can include carbazole groups such as 3-(N-carbazolyl)propyl, arylamino-functional groups such as 4-(N, N-diphenylamino)phenyl-3-propyl, and halogenated hydrocarbon groups such as 3,3,3-trifluoropropyl, 3-chloropropyl, dichlorophenyl, and 6,6,6, 5,5,4,4,3,3-nonafluorohexyl.

In some examples, the organopolysiloxane can be a dimethylvinyl-terminated dimethyl siloxane, dimethylvinylated and trimethylated silica, tetramethyl tetravinyl cyclotetrasiloxane, dimethylvinylsiloxy-terminated polydimethylsiloxane, trimethylsiloxy-terminated polydimethylsiloxane-polymethylvinylsiloxane copolymer, dimethylvinylsiloxy-terminated polydimethylsiloxane-polymethylvinylsiloxane copolymer, or tetramethyldivinyldisiloxane. In some examples, the vinyl groups of the structures in the preceding list can be substituted with allyl, hexenyl, acrylic, methacrylic or other hydrosilylation-reactive or free-radical polymerizable unsaturated groups, such as acryloxypropyl and methacryloxypropyl groups. In some examples, the organopolysiloxane can include an organopolysiloxane resin including predominantly $CH_2$=$CH(CH_3)_2SiO_{1/2}$ units, $(CH_3)_3SiO_{1/2}$ units, and $SiO_{4/2}$ units, or can be $PhSi(OSiMe_2Vi)_3$, $Si(OSiMe_2Vi)_4$, $MeSi(OSiMe_2Vi)_3$, or $Ph_2Si(OSiMe_2Vi)_2$.

In some examples, the organopolysiloxane can include an oligomeric dimethylsiloxane(D)-methylvinylsiloxane($D^{Vi}$) diol. In some embodiments, the organopolysiloxane can be an organohydrogensiloxane, such as 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), a methylhydrogensiloxy-terminated polydimethylsiloxane, or dimethylhydrogensiloxy-terminated poly(dimethylsiloxane/methylhydrogensiloxane).

In another embodiment, the organopolysiloxane includes a compound formed by copolymerizing organic compounds having polymeric backbones with the organopolysiloxane compound such that there is an average of at least one free radical polymerizable group per copolymer. Suitable organic compounds include, but are not limited to, hydrocarbon based polymers such as polyisobutylene, polybutadienes, polyisoprenes, polyolefins such as polyethylene, polypropylene and polyethylene polypropylene copolymers, polystyrenes, styrene butadiene, and acrylonitrile butadiene styrene, polyacrylates, polyethers such as polyethylene oxide and polypropyleneoxide, polyesters such as polyethylene terephthalate and polybutylene terephthalate, polyamides, polycarbonates, polyimides, polyureas, polymethacrylates, partially fluorinated or perfluorinated polymers such as polytetrafluoroethylene, fluorinated rubbers, terminally unsaturated hydrocarbons, olefins, polyolefins, and combinations thereof. The organic compound can also include a copolymer including polymers having multiple organic functionality, multiple organopolysiloxane functionality, and combinations of organopolysiloxanes with the organic compounds. The copolymer may include repeating units in a random, grafted, or blocked arrangement.

In some embodiments, the feed mixture can include an organosilane such as diphenylsilane, 2-chloroethylsilane, bis[(p-dimethylsilyl)phenyl]ether, 1,4-dimethyldisilylethane, 1,3,5-tris(dimethylsilyl)benzene, 1,3,5-trimethyl-1,3, 5-trisilane, poly(methylsilylene)phenylene, and poly(methylsilylene)methylene.

In some embodiments, the feed mixture can be substantially free of organopolysiloxane emulsions, e.g., emulsions including organopolysiloxanes. In various embodiments, less than 30 wt %, 25, 20, 15, 10, 8, 6, 4, 2, 1, 0.5, 0.1, 0.01, or less than 0.001 wt % of the feed mixture can be an emulsion including an organopolysiloxane. In other embodiments, the feed mixture includes an emulsion including an organopolysiloxane.

The liquid feed mixture can be 50 vol % or more liquid, or about 55 vol %, 60, 65, 70, 75, 80, 85, 90, 95, 96, 97, 98, 99, 99.5, 99.9, or about 99.99 vol % liquid, with the remainder gaseous phase. In the feed mixture, the one or more volatile siloxanes can independently be in a liquid phase, gaseous or vaporous phase, or a combination thereof.

The volatile siloxane can be any suitable siloxane, such that the method can be performed as described herein, such as any suitable siloxane described herein. For example, the volatile siloxane can be a linear siloxane or cyclosiloxane. A cyclosiloxane can be substituted or unsubstituted and can have about 4-20 —Si—O— units in the one or more polysiloxane rings of the cyclosiloxane. In some embodiments, the cyclosiloxane has a single ring having about 4, 5, 6, 7, 8, 9, 10, 11, 12, or about 13 —Si—O—. In various embodiments, the volatile siloxane can be hexamethyldisiloxane, octamethyltrisiloxane, decamethyltetrasiloxane, dodecamethylpentasiloxane, hexamethylcyclosiloxane (D3), octamethyltetracyclosiloxane (D4), decamethylpentacyclosiloxane (D5), dodecamethylhexacyclosiloxane (D6), and higher oligomers of linear and cyclic polydimethylsiloxanes, or a combination thereof. In some examples, the volatile siloxane can have the formula M-$D'_x$-M, M-$D_x$-$D'_y$-M, M'-$D_x$-M', M'-$D_x$-$D'_y$-M', $D_x$, $D_y$, $D'_x$, or $D'_y$, wherein M represents [$O_{0.5}$Si(Me)$_3$], -D- is [OSi(Me)$_2$], wherein M' or D' denotes a substituted M or D group, wherein the one or more substituents can be any one or more suitable substituents, such as —H, halogen, ($C_1$-$C_{20}$)alkyl, ($C_6$-$C_{20}$)aryl, ($C_2$-$C_{20}$)alkenyl, halogen-substituted ($C_{1-20}$)alkyl or ($C_6$-$C_{20}$)aryl (e.g., trifluoropropyl), substituted or unsubstituted amine, acrylate, methacrylate, oligoether, isocyanate, epoxy, and substituted or unsubstituted ($C_1$-$C_{20}$)hydrocarbyl interrupted or terminated with 0, 1, 2, or 3 groups selected from —O—, —NH—, and —S—, wherein x and y are each independently 1 to about 1,000, about 1 to about 500, or about 1, 2, 3, 4, 5, 6, 8, 10, 12, 14, 16, 18, 20, 25, 30, 35, 40, 45, 50, 60, 70, 80, 90, 100, 120, 140, 160, 180, 200, 250, or about 500 or more.

Sweep Medium.

The method includes contacting a second side of the hydrophobic membrane with a sweep medium. The sweep medium can include a vacuum, ambient pressure, or greater than ambient pressure. The sweep medium can include a gas, a liquid, or a combination of a gas or liquid. The gas can be any suitable gas, such as ambient air, compressed air, oxygen, nitrogen, helium, or argon. The liquid can be any suitable liquid, such as an aqueous liquid, an organic solvent, or a silicon fluid such as an organosilicon fluid. The vacuum can be any suitable vacuum, and can be based on at least one of the vapor pressure of the volatile siloxanes, the temperature of the system, and the flow rates of the feed mixture and the sweep medium. A vacuum pump can be preceded by a trap, such that volatile siloxanes do not enter the pump.

In some embodiments, the sweep medium includes an organosilicon fluid. The organosilicon fluid can be at least one of absorbent and adsorbent, e.g., the organosilicon fluid can be a sorbent fluid. The organosilicon fluid can include at least one of an organosiloxane and an organosilane. In some embodiments, the organosilicon fluid is substantially non-volatile and having a modest moderate viscosity, such as 10 to 500 cP at 1 rad/s, to be pumpable and stable at the temperatures of use without using excessive energy to convey the fluid. The sweep fluid can be substantially non-reactive with the volatile siloxanes being absorbed, and optionally non-reactive with the other components of the feed mixture.

The organosilicon fluid includes at least one organosilicon compound, and can additionally include any other suitable compound, including any suitable organic or inorganic component, including components that do not include silicon, including any suitable solvent or non-solvent. The organosilicon fluid can be, for example, a silane (e.g, an organosilane), a polysilane (e.g., an organopolysilane), a siloxane (e.g., an organosiloxane such as an organomonosiloxane or an organopolysiloxane), or a polysiloxane (e.g., an organopolysiloxane), such as any suitable one of such compound as known in the art. The organosilane can be a monosilane, disilane, trisilane, or polysilane. Similarly, the organosiloxane can be a disiloxane, trisiloxane, or polysiloxane. The structure of the organosilicon compound can be linear, branched, cyclic, or resinous. Cyclosilanes and cyclosiloxanes can have from 3 to 12 silicon atoms, alternatively from 3 to 10 silicon atoms, alternatively from 3 to 4 silicon atoms.

The sweep medium has properties that allow it to absorb the one or more siloxanes at a suitable speed and at sufficient quantity, such that a sufficiently efficient separation process occurs. In an embodiment including subsequent desorption of the one or more volatile siloxanes from the sweep medium, the sweep medium has properties that allow it to desorb the one or more volatile siloxanes to achieve a suitably low concentration of the one or more volatile siloxanes in the sweep medium over a suitably short period of time, such that a sufficiently efficient separation process occurs. In an embodiment that includes absorption and desorption from the sweep medium, the sweep medium has properties under the independently chosen process conditions (pressure, temperature, concentrations, flow rates, liquid/gas ratios and membrane areas) that allow it to both absorb and desorb the one or more volatile siloxanes over suitable lengths of time and in suitably large volumes, such that a sufficiently efficient absorption and desorption occur. While some sweep mediums, such as liquids including organosilicon fluids, can have the right balance of properties allowing efficient combined absorption and desorption processes, others can be better suited for either absorption or desorption process. In various embodiments, the sweep medium can be advantageously better suited for absorption, desorption, or for absorption/desorption loops, than those used in other methods for separation of a volatile siloxane from a liquid feed mixture, giving a more energy efficient or cost effective method than the other methods. It will be appreciated that depending on the use for the sweep medium, certain characteristics may be more valuable. For example, in an absorptive process wherein the sweep medium is not recycled, predominantly the absorptive properties of the sweep medium are valuable. In another example, in a combined absorptive/desorptive process wherein the sweep medium is not recycled, in some examples predominantly the desorptive properties of the sweep medium are valuable. However, in a process wherein the sweep medium is recycled, an effective combination of beneficial absorptive properties and desorptive properties is desirable.

In various embodiments, the organosilicon fluid can include an organosilicon (e.g., an organopolysiloxane, an organosiloxane, or an organosilane) having at least one silicon-bonded substituent chosen from substituted or unsubstituted $(C_1-C_{20})$alkyl, methyl, ethyl, propyl, butyl, substituted or unsubstituted $(C_6-C_{20})$aryl, phenyl, substituted or unsubstituted $(C_2-C_{20})$alkynyl, halogen-substituted $(C_{1-20})$alkyl (e.g., trifluoromethyl, trifluoropropyl, nonafluorohexyl) or $(C_6-C_{20})$aryl (e.g., pentafluorophenyl), oligoether, polyether (e.g., poly(oxy$(C_{2-5})$alkylene), and substituted or unsubstituted $(C_1-C_{20})$hydrocarbyl interrupted or terminated with 0, 1, 2, or 3 groups selected from —O—, —NH—, and —S— and optionally free of aliphatic unsaturation. In some embodiments, one or more silicon-bonded substituents are bonded to non-terminal silicon atoms. The absorbent organosilicon fluid can have sufficient functionality such that it can absorb at least some of the first component, such as about 0.1 wt % or less, or about 1 wt %, 2, 3, 4, 5, 10, 20, 30, 40, 50, 60, 70, 80, 90, 95, 96, 97, 98, 99, or about 99.9 wt % or more, such as about 1-99.9999 wt %, 1-40 wt %, 1-20 wt %, 1-10 wt %, 40-99.999 wt %, or about 50-99.99 wt %. An organosilicon compound can contain an average of about 0.001 mole % to about 100 mole % of a non-alkyl or non-methyl silicon-bonded group, such as about 0.001 mole % or less, or about 0.01, 0.1, 0.5, 1, 2, 3, 4, 5, 6, 8, 10, 12, 14, 16, 18, 20, 25, 30, 40, 50, 60, 70, 80, 90, 95, 96, 97, 98, 99, or about 99.9 mole % or more, wherein in an organopolysiloxane, the mole percent of silicon-bonded functional groups is the ratio of the number of moles of siloxane units in the organopolysiloxane having the silicon-bonded group to the total number of moles of siloxane units in the organopolysiloxane, multiplied by 100.

In some embodiments, the absorbent organosilicon fluid can be a substituted or unsubstituted polydi($(C_1-C_{10})$hydrocarbyl)siloxane (wherein each hydrocarbyl is independently selected at each occurrence, and is optionally free of aliphatic unsaturation).

In some embodiments, the organosilicon fluid is an organosilane fluid. In one example, an organosilane can have the formula $R^1_3Si—R^2—SiR^1_3$, wherein $R^1$ is silicon-bonded substituent chosen from substituted or unsubstituted $(C_1-C_{20})$alkyl (e.g., methyl, ethyl, propyl, butyl), substituted or unsubstituted $(C_6-C_{20})$aryl (e.g., phenyl), substituted or unsubstituted $(C_2-C_{20})$alkynyl or $(C_2-C_{20})$alkenyl, halogen-substituted $(C_1-20)$alkyl (e.g., trifluoromethyl, trifluoropropyl, nonafluorohexyl), halogen-substituted $(C_6-C_{20})$aryl (e.g., pentafluorophenyl), oligoether, polyether (e.g., poly(oxy$(C_{2-5})$alkylene), and substituted or unsubstituted $(C_1-C_{20})$hydrocarbyl interrupted or terminated with 0, 1, 2, or 3 groups selected from —O—, —NH—, and —S— and optionally free of aliphatic unsaturation. The variable $R^2$ can be a hydrocarbylene group free of aliphatic unsaturation having a formula selected from monoaryl such as 1,4-disubstituted phenyl, 1,3-disubstituted phenyl; or bisaryl such as 4,4'-disubstituted-1,1'-biphenyl, 3,3'-disubstituted-1,1'-biphenyl, or similar bisaryl with a hydrocarbon chain including 1 to 6 methylene groups bridging one aryl group to another.

In various embodiments, the organosilicon fluid can include or can be an organosiloxane fluid. In some embodiments, the organosiloxane fluid can include an organopolysiloxane compound. An organopolysiloxane compound can be nonfunctionalized, having only alkyl groups substituted to each siloxy group. An organopolysiloxane compound can be functionalized, having groups other than alkyl groups (e.g., other than methyl groups) substituted to at least one siloxy group, such as silicon-bonded substituent chosen from substituted or unsubstituted $(C_1-C_{20})$alkyl, methyl, ethyl, propyl, butyl, substituted or unsubstituted $(C_6-C_{20})$aryl, phenyl, substituted or unsubstituted $(C_2-C_{20})$alkynyl, halogen-substituted $(C_{1-20})$alkyl (e.g., trifluoromethyl, trifluoropropyl, nonafluorohexyl) or $(C_6-C_{20})$aryl (e.g., pentafluorophenyl), oligoether, polyether (e.g., poly(oxy$(C_{2-5})$alkylene), and substituted or unsubstituted $(C_1-C_{20})$hydrocarbyl interrupted or terminated with 0, 1, 2, or 3 groups selected from —O—, —NH—, and —S— and optionally free of aliphatic unsaturation. In some examples, the organopolysiloxane compound has an average of at least one, two, or more than two non-alkyl (e.g., non-methyl) functional groups per molecule. The organopolysiloxane compound can have a linear, branched, cyclic, or resinous structure. The organopolysiloxane compound can be a homopolymer or a copolymer. The organopolysiloxane compound can be a disiloxane, trisiloxane, or polysiloxane. In some embodiments, the organosilicon fluid includes predominantly one or more organopolysiloxanes. In various embodiments, the silicone fluid can include 0.1 wt % or less organopolysiloxane, or 1 wt %, 2, 3, 4, 5, 10, 20, 30, 40, 50, 60, 70, 80, 90, 95, 96, 97, 97, 98, 99, or about 99.9 wt % or more organopolysiloxanes. In some embodiments, the silicone fluid can include about 1-99.9999 wt %, 40-99.999 wt %, or about 60-99.99 wt % organopolysiloxanes.

Examples of absorbent organosilicon fluids can include one or more of a polydimethylsiloxane, polydiethylsiloxane, polymethylphenylsiloxane, polydiphenylsiloxane, tetra-n-butylsilane, pentafluorophenyltrimethylsilane, 1,3-diphenyl-1,1,3,3,-tetramethyldisiloxane, octamethyl-T-8-silsesquioxane, phenyltris(trimethylsiloxy)silane, tetrakis(trimethylsiloxy)silane, 1,1,3,3-tetraphenyldimethyldisiloxane, 1,1,5,5-tetraphenyl-1,3,3,5-tetramethyltrisiloxane, nonafluorohexyltrimethylsilane, trifluoromethyltrimethylsilane, and 3,5,7-triphenylnonamethylpentasiloxane, and copolymers or compatibilized mixtures thereof.

The sweep medium can include one compound or more than one compound. In some embodiments, the sweep medium can include a silicone fluid, an organic oil, a polyether, or halogen-substituted versions thereof. The sweep medium can include one or more organic compounds dissolved or suspended therein, wherein the compounds can be liquid, solid, or gas (e.g., in pure form at standard temperature and pressure). In some embodiments the sweep medium can be pre-charged with a suitable level of the volatile siloxane component at a level suitable for efficient operation of the absorption process with a desorption or regeneration process. The sweep medium may also optionally contain heat stabilizers, antifoams, rheology modifiers, corrosion inhibitors, acid scavengers, base scavengers, dyes, pigments, surfactants, or a combination thereof, such as to make the solution more amenable to extended use and monitoring.

A particular sweep medium has a characteristic speed with which it can absorb a given quantity of a particular volatile siloxane. Different sweep mediums can have different abilities to absorb certain volatile siloxanes, with regard to the volume of the volatile siloxane that can be absorbed, and the concentration of a volatile siloxane at which the sweep medium begins to become saturated with the volatile siloxane. As the sweep medium becomes saturated with the particular volatile siloxane, the rate of absorption can decrease. When the sweep medium is relatively depleted of the particular volatile siloxane, as compared to the concentration at which saturation begins to occur, the rate of absorption of the volatile siloxane can be higher. Therefore, to maximize the efficiency of the removal of the one or more volatile siloxanes from the feed mixture, the sweep medium can be depleted in the one or more volatile siloxanes (as compared to a saturated or semi-saturated state).

Hydrophobic Membrane.

The hydrophobic membrane can be any suitable membrane or combination of membranes as described further herein. For example, for a method including absorption, or desorption, of a volatile siloxane to or from a sweep medium, the first membrane, or the second membrane, can be a single membrane, or a bank or array of membranes of any size, shape, or form factor, including a module of hollow fiber membranes. The one or more membranes can be selectively permeable to any one or more volatile siloxanes in the feed mixture. In embodiments including hollow fiber membranes, the fibers can collectively have a bore-side and a shell-side (e.g., such as in a particular hollow fiber membrane module), wherein at least one of 1) the first side of the hollow fiber membrane is the bore-side and the second side of the hollow fiber membrane is the shell-side, and 2) the first side of the hollow fiber membrane is the shell-side and the second side of the hollow fiber membrane is the bore-side.

Embodiments of the membrane include a cured product of a silicone composition, such a cured product of an organopolysiloxane composition. Various methods of curing can be used, including any suitable method of curing, including for example hydrosilylation curing, condensation curing, free-radical curing, amine-epoxy curing, radiation curing, cooling, or any combination thereof.

The method of the present invention includes the use of one or more membranes. One or more of the membranes can be dense membranes. One or more of the membranes can be nonporous. Some types of pores can penetrate from one major side of a membrane to another major side, such as cylindrical pores shaped approximately as cylinders, or such as sponge pores, for example pores that include randomly shaped cavities or channels, that form a connection from one major side to the other major side. Some types of pores do not penetrate from one major side of a membrane to another major side, such as blind pores, also referred to as surface pores. Some types of sponge pores can also not penetrate from one major side of the membrane to the other major side. In some embodiments, a dense membrane of the present invention can include substantially no pores, including both pores that penetrate from one major side to the other major side, and including pores that do not penetrate from one major side to the other major side, such as less than about 100,000 pores per $mm^2$, or less than about 10,000, 1000, 100, 50, 25, 20, 15, 10, 5, or less than about 1 pore per $mm^2$. In some embodiments, a dense membrane can include substantially no pores that penetrate from one side to the other, such as less than about 100,000 penetrating pore per $mm^2$, or less than about 10,000, 1000, 100, 50, 25, 20, 15, 10, 5, or less than about 1 penetrating pore per $mm^2$, but the membrane can also include any suitable number of pores that do not penetrate from one major side of the membrane to the other major side of the membrane, such as at least one of surface pores and sponge pores, such as equal to or more than about 100,000 non-penetrating pores per $mm^2$, or less than 10,000, 1000, 100, 50, 25, 20, 15, 10, 5, or equal to or more than about 1 non-penetrating pore per $mm^2$. In some embodiments, a dense membrane can have substantially zero pores penetrating from one major side of the membrane to the other major side having a diameter larger than about 0.00001, 0.0001, 0.001, 0.005, 0.01, 0.05, 0.1, 0.2, 0.3, 0.4, 0.5, 0.6, 0.7, 0.8, 0.9, 1, or larger than about 2 µm, such as less than about 100,000 pores per $mm^2$, or less than about 10,000, 1000, 100, 50, 25, 20, 15, 10, 5, or less than about 1 pore per $mm^2$. Pore size can be determined by the average size of the pore throughout its path through the entire thickness or only partway through the membrane. Pore size can be determined by the average size of the pore at the surface of the membrane. Any suitable analytical technique can be used to determine the pore size. Embodiments encompass dense membranes having any combination of approximate maximum sizes from the dimensions given in this paragraph for each of the pores passing all the way through the membrane, cylinder pores, sponge pores, blind pores, any other type of pore, or combination thereof. In some embodiments, a dense membrane does have at least one of pores passing all the way through the membrane, cylinder pores, sponge pores, blind pores, and any other type of pore, wherein the pores have a size smaller than the maximum size of the dimensions given in this paragraph.

The one or more membranes can have any suitable thickness. In some examples, the one or more membranes have a thickness of about 1 µm to about 20 µm, or about 2, 3, 4, 5, 6, 7, 8, 9, 10, 11, 12, 13, 14, or 15 µm to about 20 µm. In some examples, the one or more membranes have a thickness of about 0.1 µm to about 300 µm, or about 10, 15, 20, 25, or 30 µm to about 200 µm. In other examples, the one or more membranes have a thickness of about 0.01 µm to about 2000 µm, or about 0.01 µm or less, about 0.1 µm, 1, 2, 3, 4, 5, 10, 15, 20, 25, 30, 40, 50, 60, 70, 80, 90, 100, 110, 120, 130, 140, 150, 160, 170, 180, 190, 200, 210, 220, 230, 240, 250, 260, 270, 280, 290, 300, 350, 400, 500, 600, 700, 800, 900, 1000, 1250, 1500, 1750 µm, or about 2000 µm or more.

The one or more membranes can be selectively permeable to one substance over another. In one example, the one or more membranes are selectively permeable to one volatile siloxane over other volatile siloxanes or over other materials in the feed mixture. In some embodiments, the membrane has a permeation coefficient of the one or more volatile siloxanes of about 0.001 or less, or at least about 0.01 Barrer, 0.1, 1,5, 10, 20, 30, 40, 50, 60, 70, 80, 90, 100, 120, 140, 160, 180, 200, 240, 280, 300, 400, 500, 600, 700, 800, 900, 1000, 1200, 1400, 1600, 1800, or at least about 2000 Barrer, when tested at room temperature without the sweep medium present.

The one or more membranes can have any suitable shape. In some examples, the one or more membranes are plate-and-frame membranes, spiral wound membranes, tubular membranes, capillary fiber membranes, or hollow fiber membranes. The one or more membranes can be a hollow fiber membrane module containing a plurality of hollow fiber membranes, each fiber having a bore side and a shell side. The fibers in a hollow fiber membrane module can collectively have a bore side and a shell side accessible through a single connector on each side of the module. Alternately, the fibers in a hollow fiber membrane module can have a bore side and a shell side accessible through multiple connectors placed at various points in the module. In some embodiments of the method, the feed mixture can be contacted to the bore side of the one or more hollow fiber membranes, and the sweep medium can be contacted to the shell side. In other embodiments of the method, the feed mixture can be contacted to the shell side of the one or more hollow fiber membranes, and the sweep medium can be contacted to the bore side.

The one or more membranes can be free-standing or supported by a porous substrate. In some embodiments, the pressure on either side of the one or more membranes can be about the same. In other embodiments, there can be a pressure differential between one side of the one or more membranes and the other side of the one or more membranes. For example, the pressure on the feed and retentate side of the one or more membranes can be higher than the pressure on the permeate side of the one or more membranes. In other examples, the pressure on the permeate side of the one or more membranes can be higher than the pressure on the retentate side of the one or more membranes.

Any number of membranes can be used to accomplish the separation. Any combination of free-standing and supported membranes can be used. Any suitable surface area of the one or more membranes can be used. For example, the surface area of each membrane, or the total surface area of the membranes, can be about 0.01 m$^2$, 0.1, 1, 2, 3, 4, 5, 10, 100, 200, 300, 400, 500, 600, 700, 800, 900, 1000, 1200, 1400, 1600, 1800, 2000, 2200, 2400, 2600, 2800, 3000, 3200, 3400, 3800, 4000, 5000, 10,000, 50,000, 100,000, 500,000, or about 1,000,000 m$^2$.

In one example, the one or more membranes are one or more hollow tube or fiber membranes. Any number of hollow tube or fiber membranes can be used. For example, 1 hollow tube or fiber membrane, 2, 3, 4, 5, 10, 20, 50, 100, 500, 1000, 2000, 5000, 10,000, 100,000 or about 1,000,000 hollow tube or fiber membranes can be used together as the one or more membranes. In one example, the one or more membranes are crosslinked silicone or organopolysiloxane hollow tube or fiber membranes. In one example, the one or more membranes are one or more free standing hollow tube or fiber membranes (e.g., having no porous support). In one example, the one or more membranes are crosslinked silicone or organopolysiloxane free standing hollow tube or fiber membranes (e.g., having no porous support). The one or more hollow tube or fiber membranes can be in the form of a modular cartridge, such that the one or more membranes can be easily replaced or maintained. In one embodiment, the inside of the one or more hollow tube or fiber membranes can be the first side of the one or more membranes, and the outside of the one or more hollow tube or fiber membranes can be the second side of the one or more membranes. In another embodiment, the outside of the one or more hollow tube or fiber membranes can be the first side of the one or more membranes, and the inside of the one or more hollow tube or fiber membranes can be the second side of the one or more membranes. In some examples, a pressure difference is maintained between the first and second side of the one or more hollow tube or fiber membranes.

In some embodiments, various embodiments of the present invention can provide a module that allows limited or no heat transfer from the sweep medium to the feed components or retentate components or vice versa. In other embodiments, various embodiments of the present invention can provide a module that allows substantial heat transfer from the medium to the feed components or retentate components or vice versa. For example, the present invention can provide a system that allows concurrent heat and mass exchange between the feed composition and the sweep medium.

In some embodiments of the present invention, the membrane is supported on a porous or highly permeable non-porous substrate. The substrate can be any suitable substrate. A supported membrane has the majority of the surface area of at least one of the two major sides of the membrane contacting a porous or highly permeable non-porous substrate. A supported membrane on a porous substrate can be referred to as a composite membrane, where the membrane is a composite of the membrane and the porous substrate. The porous substrate on which the supported membrane is located can allow gases or liquids to pass through the pores and to reach the membrane. The supported membrane can be attached (e.g., adhered) to the porous substrate. The supported membrane can be in contact with the substrate without being adhered. The porous substrate can be partially integrated, fully integrated, or not integrated into the membrane.

In some embodiments, the membrane is unsupported, also referred to as free-standing. The majority of the surface area on each of the two major sides of a membrane that is free-standing is not contacting a substrate, whether the substrate is porous or not. In some embodiments, a membrane that is free-standing can be 100% unsupported. A membrane that is free-standing can be supported at the edges or at the minority (e.g., less than 50%) of the surface area on either or both major sides of the membrane. A free-standing membrane can have any suitable shape, regardless of the percent of the free-standing membrane that is supported. Examples of suitable shapes for free-standing membranes include, for example, squares, rectangles, circles, tubes, cubes, spheres, cones, cylinders, and planar sections thereof, with any thickness, including variable thicknesses.

The one or more membranes can include the cured product of an organosilicon composition. The organosilicon composition can be any suitable organosilicon composition. The curing of the organosilicon composition gives a cured product of the organosilicon composition. The curable organosilicon composition includes at least one suitable organopolysiloxane compound. The silicone composition includes suitable ingredients to allow the composition to be curable in any suitable fashion. In addition to the at least one suitable polysiloxane, the organosilicon composition can include any suitable additional ingredients, including any suitable organic or inorganic component, including components that do not include silicon, or including components that do not include a polysiloxane structure. In some examples, the cured product of the silicone composition includes a polysiloxane.

The curable silicon composition can include molecular components that have properties that allow the composition to be cured. In some embodiments, the properties that allow the silicone composition to be cured are specific functional groups. In some embodiments, an individual compound contains functional groups or has properties that allow the silicone composition to be cured by one or more curing methods. In some embodiments, one compound can contain functional groups or have properties that allow the silicone composition to be cured in one fashion, while another compound can contain functional groups or have properties that allow the silicone composition to be cured in the same or a different fashion. The functional groups that allow for curing can be located at pendant or, if applicable, terminal positions in the compound.

The curable silicon composition can include an organosilicon compound. The organosilicon compound can be any organosilicon compound. The organosilicon compound can be, for example, a silane (e.g., an organosilane), a polysilane (e.g., an organopolysilane), a siloxane (e.g., an organosiloxane such as an organomonosiloxane or an organopolysiloxane), a polysiloxane (e.g., an organopolysiloxane), or a polysiloxane-organic copolymer, such as any suitable one of such compound as known in the art. The curable silicone composition can contain any number of suitable organosilicon compounds, and any number of suitable organic compounds. An organosilicon compound can include any functional group that allows for curing.

In some embodiments, the organosilicon compound can include a silicon-bonded hydrogen atom, such as organohydrogensilane or an organohydrogensiloxane. In some embodiments, the organosilicon compound can include an alkenyl group, such as an organoalkenylsilane or an organoalkenyl siloxane. In other embodiments, the organosilicon compound can include any functional group that allows for curing. The organosilane can be a monosilane, disilane, trisilane, or polysilane. Similarly, the organosiloxane can be a disiloxane, trisiloxane, or polysiloxane. The structure of the organosilicon compound can be linear, branched, cyclic, or resinous. Cyclosilanes and cyclosiloxanes can have from 3 to 12 silicon atoms, alternatively from 3 to 10 silicon atoms, alternatively from 3 to 4 silicon atoms.

The organosilicon compound can be an organopolysiloxane compound. In some examples, the organopolysiloxane compound has an average of at least one, two, or more than two functional groups that allow for curing. The organopolysiloxane compound can have a linear, branched, cyclic, or resinous structure. The organopolysiloxane compound can be a homopolymer or a copolymer. The organopolysiloxane compound can be a disiloxane, trisiloxane, or polysiloxane. The organopolysiloxane compound can be a single organopolysiloxane or a combination including two or more organopolysiloxanes that differ in at least one of the following properties: structure, viscosity, average molecular weight, siloxane units, and sequence.

System.

In various embodiments, the present invention provides a system for separating a volatile siloxane from a liquid mixture. The system can be any suitable system than can perform an embodiment of the method described herein. For example, the system can include a first hydrophobic membrane. The system can include a liquid feed mixture including a polymer and at least one volatile siloxane, the liquid feed mixture contacting a first side of the first hydrophobic membrane. The system can include a sweep medium including at least one of a sweep gas, a sweep liquid, and a vacuum, the sweep medium contacting a second side of the membrane. The system can include a permeate mixture on the second side of the membrane, the permeate mixture formed by the contacting of the first side with the feed mixture and the second side with the sweep medium, wherein the permeate mixture is enriched in the volatile siloxane. The system includes a retentate mixture on the first side of the membrane, the retentate mixture formed by the contacting of the first side with the feed mixture and the second side with the sweep medium, wherein the retentate mixture is depleted in the volatile siloxane.

EXAMPLES

Various embodiments of the present invention can be better understood by reference to the following Examples which are offered by way of illustration. The present invention is not limited to the Examples given herein.

Example 1. Octamethyltetracyclosiloxane (D4) Removal from Silicone Fluid Fed to Bore-Side, Using Vacuum A mixture ("Mixture 1") of 704 g 50 cSt polydimethylsiloxane ("PDMS") (Xiameter™, Dow Corning) and 96 g D4 was prepared and mixed thoroughly in a bottle. The mixture was pumped into the bore-side of a dense silicone hollow fiber membrane (HFM) module (MedArray, Inc.) using a Manostat Carter Cassette Pump with 1.42 mm inner diameter tubing. The silicone hollow fiber membrane module comprised sufficient number fibers of about 8 cm active length, 300 micron outer diameter and 190 micron inner diameter to constitute 2500 $cm^2$ of surface area, with a porous cylindrical tube oriented axially down the center of the fiber bundle connected to an external port, around which the fibers were arranged to allow radial cross flow on the shell side. The fluid was pumped through a section of ⅛" stainless steel tubing before entering the HFM module. Each of the stainless steel tubing and the module were wrapped with heat tape controlled by separate temperature controllers. Both were also wrapped with fiberglass insulation. The mixture was pumped through the module with a setting of 5 rpm (corresponding to an approximate rate of 0.6 mL/min). The shell-side of the module was evacuated with a vacuum pump to a pressure of 1.2 Torr, with the vacuum port on the opposite end of the module from the feed port. Unused ports on the module were sealed off.

The fluid temperature entering and exiting the separation module was monitored. The fluid was pumped to waste until a steady state was realized. Steady state temperatures for this Example were 87° C. at the fluid inlet and 73° C. at the fluid outlet.

The stripped fluid was collected in a clean container. The final stripped material was tested gravimetrically for volatile content. Approximately 2 g of material was placed in an aluminum cup and then that cup was heated for 1 hour at 150° C. There was a total weight loss of 0.73%, corresponding to the removal of 90.2 g or 93.9 wt % of the original D4 in the mixture. The sample was place back in the oven for another hour at 150° C. then re-weighed. The change in mass was negligible from the first hour to the $2^{nd}$ hour of heating, confirming that the volatile content was measured completely in 1 hour/150° C. A schematic of a module set up for stripping out of a feed fed to the bore side is illustrated in FIG. 1. Although FIG. 1 illustrates an apparatus with only one port connected to vacuum and the other ports plugged, in other embodiments, 2 or 3 ports can be connected to vacuum.

Example 2. Decamethylpentacyclosiloxane (D5) Removal from Silicone Fluid Fed to Bore-Side, Using Vacuum A mixture ("Mixture 2") of 704 g 50 cSt PDMS and 96 g D5 was prepared and mixed thoroughly in a bottle. The mixture was pumped into the bore-side of a dense silicone hollow fiber membrane (HFM) module (MedArray, Inc.) using a Manostat Carter Cassette Pump with 1.42 mm inner diameter tubing. The HFM module was identical to that used in Example 1. The fluid was pumped through a section of ⅛" stainless steel tubing before entering the HFM module. Each of the stainless steel tubing and the module were wrapped with heat tape controlled by separate temperature controllers. Both were also wrapped with fiberglass insulation. The mixture was pumped through the module with a setting of 5 rpm (corresponding to an approximate rate of 0.6 mL/min). The shell-side of the module was evacuated with a vacuum pump to a pressure of 0.78 Torr, with the vacuum port on the opposite end of the module from the feed port. Unused ports on the module were sealed off. A schematic of a module set up for stripping out of a feed fed to the bore side is illustrated in FIG. 1.

The fluid temperature entering and exiting the separation module was monitored. The fluid was pumped to waste until a steady state was realized. Steady state temperatures for this Example were 97° C. at the fluid inlet and 70° C. at the fluid outlet.

The stripped fluid was collected in a clean container. The final stripped material was tested gravimetrically for volatile content. Approximately 2 g of material was placed in an aluminum cup and then that cup was heated for 1 hour at 150° C. There was a total weight loss of 2.22%, corresponding to the removal of 78.2 g or 81.5 wt % of the D5 in the mixture. The sample was place back in the oven for another hour at 150° C. then re-weighed. The change in mass was negligible from the first hour to the $2^{nd}$ hour of heating, confirming that the volatile content was measured completely in 1 hour/150° C.

Example 3. Octamethyltetracyclosiloxane (D4) and Decamethylpentacyclosiloxane (D5) Removal from Silicone Fluid Fed to Bore-Side, Using Vacuum A mixture ("Mixture 3") of 450 g 50 cSt PDMS (Xiameter™, Dow Corning), 31.41 g D4 and 18.6 g D5 was prepared and mixed thoroughly in a bottle. The mixture was pumped into the bore-side of a dense silicone hollow fiber membrane (HFM) module (MedArray, Inc.) using a Manostat Carter Cassette Pump with 1.42 mm inner diameter tubing. The HFM module was identical to that used in Example 1. The fluid was pumped through a section of ⅛" stainless steel tubing before entering the HFM module. Each of the stainless steel tubing and the module were wrapped with heat tape controlled by separate temperature controllers. Both were also wrapped with fiberglass insulation. The mixture was pumped through the module with a setting of 5 rpm (corresponding to an approximate rate of 0.6 mL/min). The shell-side of the module was evacuated with a vacuum pump to a pressure of 0.73 Torr, with the vacuum port on the opposite end of the module from the feed port. Unused ports on the module were sealed off. A schematic of a module set up for stripping out of a feed fed to the bore side is illustrated in FIG. 1.

The fluid temperature entering and exiting the separation module was monitored. The fluid was pumped to waste until a steady state was realized. Steady state temperatures for this Example were 83° C. at the fluid inlet and 76° C. at the fluid outlet.

The stripped fluid was collected in a clean container. The final stripped material was tested gravimetrically for volatile content. Approximately 2 g of material was placed in an aluminum cup and then that cup was heated for 1 hour at 150° C. There was a total weight loss of 1.09%, corresponding to the removal of 44.6 g or 89.1 wt % of the D4 and D5 in the mixture. The sample was place back in the oven for another hour at 150° C. then re-weighed. The change in mass was negligible from the first hour to the $2^{nd}$ hour of heating, confirming that the volatile content was measured completely in 1 hour/150° C.

Example 4. Octamethyltetracyclosiloxane (D4) Removal from Silicone Fluid Fed to Shell-Side, Using Vacuum A mixture ("Mixture 4") of 708 g 50 cSt PDMS (Xiameter™, Dow Corning) and 96.6 g D4 was prepared and mixed thoroughly in a bottle. The mixture was pumped into the shell-side of a dense silicone hollow fiber membrane (HFM) module (MedArray, Inc.) using a Manostat Carter Cassette Pump with 3.175 mm inner diameter tubing. The HFM module was identical to that used in Example 1. The fluid was pumped through a section of ⅛" stainless steel tubing before entering the HFM module. Each of the stainless steel tubing and the module were wrapped with heat tape controlled by separate temperature controllers. Both were also wrapped with fiberglass insulation. The mixture was pumped through the shell-side of the module with a setting of 5 rpm (corresponding to an approximate rate of 3.1 mL/min). The bore-side of the module was evacuated with a vacuum pump to a pressure of 1.3 Torr, with the vacuum port on the opposite end of the module from the feed port. Unused ports on the module were sealed off.

The fluid temperature entering and exiting the separation module was monitored. The fluid was pumped to waste until a steady state was realized. The steady state temperature for this Example was 89° C. at the fluid outlet.

Figure 2:
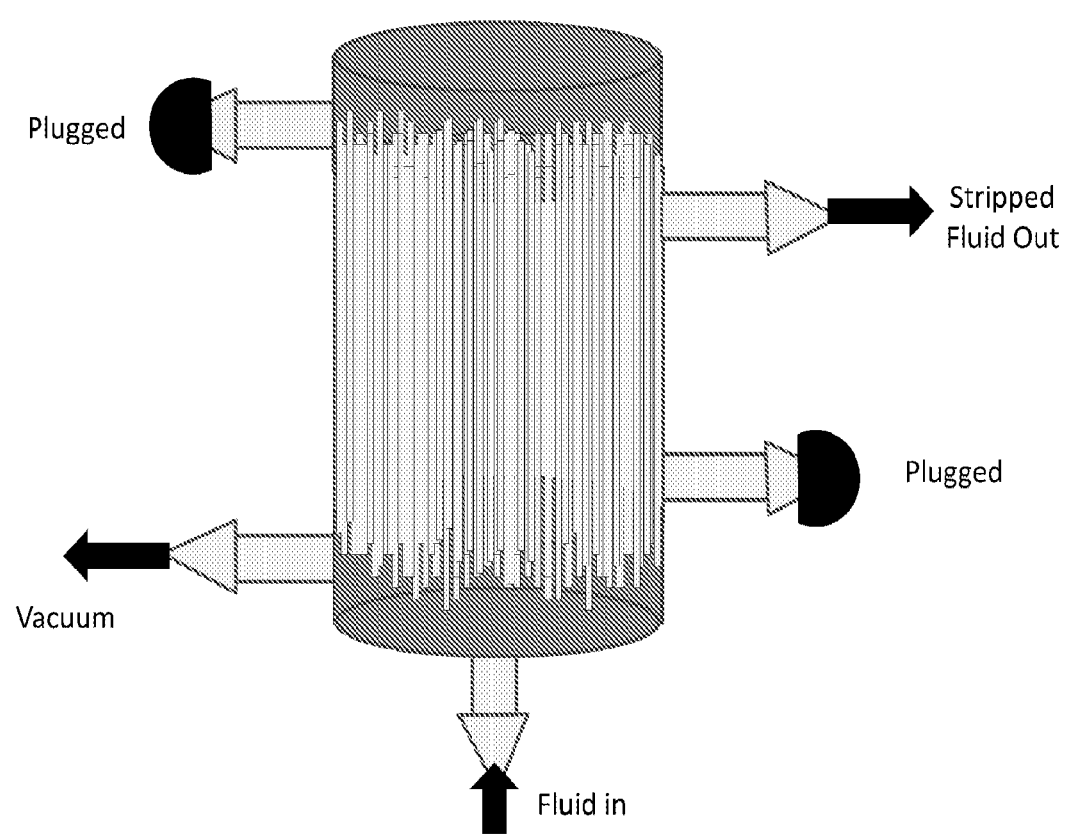
FIG. 2 illustrates a schematic of a module set up for shell-side stripping, in accordance with various embodiments.

The stripped fluid was collected in a clean container. The final stripped material was tested gravimetrically for volatile content. Approximately 2 g of material was placed in an aluminum cup and then that cup was heated for 1 hour at 150° C. There was a total weight loss of 6.38%, corresponding to the removal of 45.2 g or 46.8 wt % of the D4 in the mixture. The sample was place back in the oven for another hour at 150° C. then re-weighed. The change in mass was negligible from the first hour to the $2^{nd}$ hour of heating, confirming that the volatile content was measured completely in 1 hour/150° C. FIG. 2 illustrates a schematic of a module set up for stripping out of a feed fed to the shell-side. Although FIG. 2 illustrates vacuum only being applied to one port with the other port plugged, in other embodiments, both ports can have vacuum applied. Although FIG. 2 illustrates feed mixture entering one port and exiting another, with the third port plugged, any suitable combination of fluid in and fluid out can be used with the three shell-side ports, such that fluid in can occur in one or two ports, and fluid out can occur in one or two ports.

Example 5. Octamethyltetracyclosiloxane (D4) Removal from Silicone Fluid Fed to Bore-Side, Using Liquid Sweep A fluid mixture identical in composition to Mixture 1 ("Feed") was prepared and mixed thoroughly in a bottle. The feed mixture was pumped into the bore-side of a dense silicone hollow fiber membrane (HFM) module (MedArray, Inc.) using a Manostat Carter Cassette Pump with 3.175 mm ID tubing. The HFM module was identical to that used in Example 1. The fluid was pumped through a section of ¼" stainless steel tubing before entering the HFM module. Each of the stainless steel tubing and the module were wrapped with heat tape controlled by separate temperature controllers. Both were also wrapped with fiberglass insulation. The Feed mixture was pumped through the bore-side of the module with a setting of 50 rpm (corresponding to an approximate rate of 5.5 mL/min). The shell-side of the module was swept with a counter-current flow of neat 50 cSt PDMS (Dow Corning) ("Sweep Fluid") at a flow rate of 25.6 mL/min. The sweep fluid was chilled to a temperature of 13° C. prior to entering the module.

The fluid temperatures entering and exiting the separation module was monitored. The fluid was pumped to waste until a steady state was realized. The steady state temperature for this Example was 38° C. at the fluid outlet of the feed mixture (bore-side).

Figure 3:
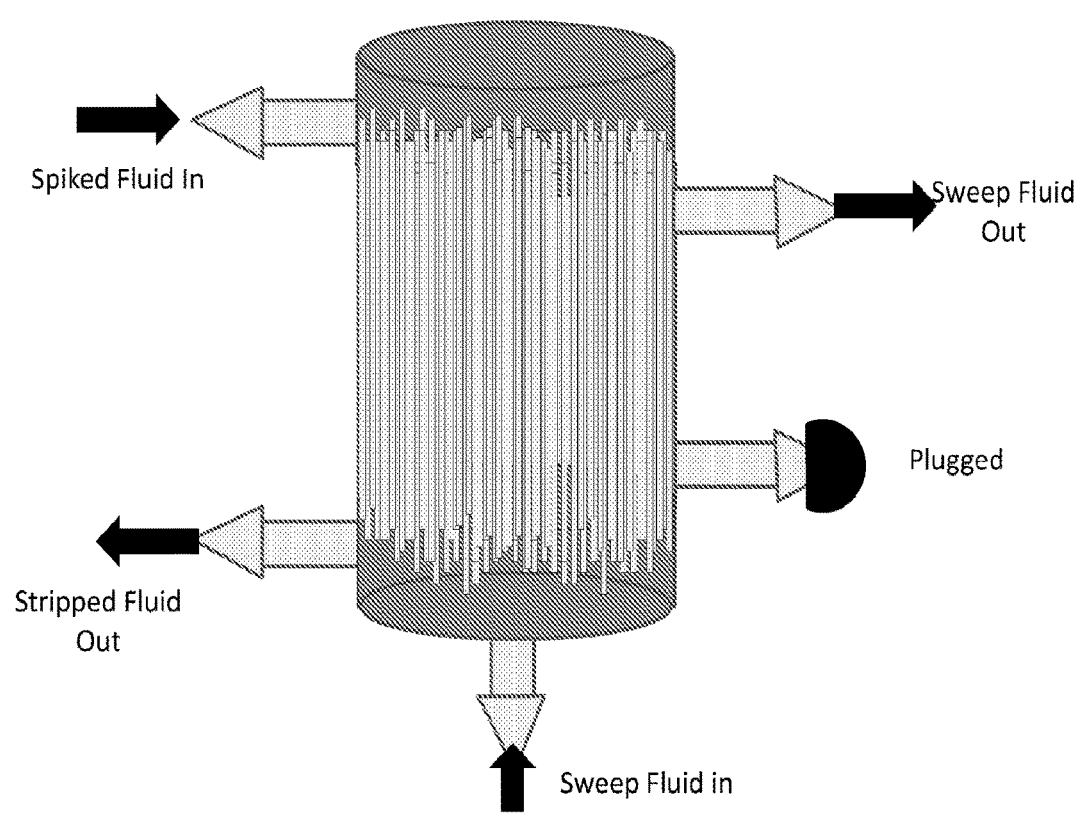
FIG. 3 illustrates a schematic of a bore-side stripping module with fluid sweep, in accordance with various embodiments.

The stripped fluid was collected in a clean container. The final stripped material was tested gravimetrically for volatile content. Approximately 2 g of material was placed in an aluminum cup and then that cup was heated for 1 hour at 150° C. There was a total weight loss of 0.74%, corresponding to the removal of 90.0 g or 93.8% of the D4 in the mixture. The sample was place back in the oven for another hour at 150° C. then re-weighed. The change in mass was negligible from the first hour to the $2^{nd}$ hour of heating, confirming that the volatile content was measured completely in 1 hour/150° C. FIG. 3 illustrates a schematic of stripping out of a feed fed to the bore side.

Examples 6a-m. Octamethyltetracyclosiloxane (D4) Removal from Silicone Fluid Fed to Bore-Side, Using Vacuum: Variation of Parameters in Example 1

Example 1 was followed with variation of parameters as shown in Table 1.

TABLE 1

Variation of parameters described for Example 1.

| Example | Fluid Flow | Pump Speed (RPM) | Vacuum (Torr) | Fluid Outlet Temp (° C.) | 1 Hour @ 150° C. | % D4 Removed |
|---------|------------|------------------|---------------|--------------------------|------------------|--------------|
| 1       | Bore       | 5                | 1.2           | 73°                      | 0.73             | 93.9         |
| 6a      | Bore       | 5                | 1.4           | 73°                      | 0.73             | 93.92        |
| 6b      | Bore       | 7.5              | 2.5           | 66°                      | 1.72             | 85.67        |
| 6c      | Bore       | 5                | 2.4           | 57°                      | 1.50             | 87.50        |

TABLE 1-continued

Variation of parameters described for Example 1.

| Example | Fluid Flow | Pump Speed (RPM) | Vacuum (Torr) | Fluid Outlet Temp (° C.) | 1 Hour @ 150° C. | % D4 Removed |
|---------|------------|------------------|---------------|--------------------------|------------------|--------------|
| 6d      | Bore       | 12.5             | 2.1           | 80°                      | 2.06             | 82.83        |
| 6e      | Bore       | 10               | 2             | 40°                      | 6.60             | 45.00        |
| 6f      | Bore       | 5                | 1.6           | 40°                      | 6.52             | 45.67        |
| 6g      | Bore       | 3.5              | 5.5           | 51°                      | 2.63             | 78.08        |
| 6h      | Bore       | 5                | 2.1           | 66°                      | 1.09             | 90.92        |
| 6i      | Bore       | 7.5              | 2.1           | 76°                      | 1.12             | 90.67        |
| 6j      | Bore       | 10               | 2.1           | 79°                      | 1.58             | 86.83        |

Examples 7a-c. Octamethyltetracyclosiloxane (D4) Removal from Silicone Fluid Fed to Shell-Side, Using Vacuum: Variation of Parameters from Example 4

Example 4 was followed with variation of parameters as shown in Table 2.

TABLE 2

Variation of parameters described for Example 4.

| Example | Fluid Flow | Pump Speed (RPM) | Vacuum (Torr) | Fluid Outlet Temp (° C.) | 1 Hour @ 150° C. | % D4 Removed |
|---------|------------|------------------|---------------|--------------------------|------------------|--------------|
| 4       | Shell      | 5                | 1.3           | 89°                      | 6.38             | 46.8         |
| 7a      | Shell      | 30               | 36            | RT                       | 11.74            | 2.17         |
| 7b      | Shell      | 5                | 1.4           | 50°                      | 7.98             | 33.50        |
| 7c      | Shell      | 5                | 1.3           | 89°                      | 6.38             | 46.83        |

Examples 8a-8o. Octamethyltetracyclosiloxane (D4) Removal from Silicone Fluid Fed to Bore-Side, Using Liquid Sweep: Variation of Parameters from Example 5

Example 5 was followed with variation of parameters as shown in Table 3. In all cases, except the starting material shown in Example 8a, the first sample denotes the feed PDMS fluid spiked with 12% D4 after stripping (e.g., 8b-1) and the second sample denotes the sweep fluid used to devolatalize the corresponding first sample (e.g., 8b-2). Volatile content is the measured percent weight loss when testing for volatile content after processing by heating at 150° C. as described in the examples. For example, the 12% D4 as made (Example 8a) is 12.09%. This is as expected because 12% volatile D4 was added to PDMS to make this sample. In the same way, Example 8b had 3.52% volatiles remaining in the sample after stripping. The temperature (° C.) reported is the temperature of the fluid at the module inlet. In the first samples, this is the temperature of the 12% D4 in PDMS as it enters the module for desorption. In the second samples, this is the temperature of the sweep fluid as it enters the module. The flow rate (g/min) is the flow rate of the 12% D4 in PDMS and sweep fluid in grams/minute. The percent of total D4 removed is the weight percent of the D4 that was removed from the original sample. For example, if this number is 75% that means that 75% of the D4 in the sample was removed. A 20% would mean that only 20% of the D4 was removed. The weight loss/gain in 10 min (g) is the number of grams that would be removed from the spiked PDMS or the number of grams that would be gained by the sweep fluid over the course of a 10 minute run. This ensures that the mass balance is approximately preserved, e.g., the amount of volatiles absorbed in 10 min is close to the amount desorbed from the fluid in 10 min under the respective flow rates used and concentrations measured.

TABLE 3

Variation of parameters described for Example 5.

| Example | Description | Volatile Content (%) | Temp (° C.) | Flow Rate (g/min) | % of Total D4 Removed | Wt Loss/Gain in 10 min (g) |
|---|---|---|---|---|---|---|
| 8a-1 | 12% D4 in PDMS; As Made | 12.09 | 23 | NA | NA | |
| 8a-2 | Sweep Fluid.; Neat | 0.02 | 23 | NA | NA | |
| 5a-1 | 12% D4 in PDMS; Stripped | 0.74 | 38 | 5.5 | 93.88% | −6.24 |
| 5a-2 | Used Sweep Fluid | NM | 13 | 25.6 | NM | NM |
| 8b-1 | 12% D4 in PDMS; Stripped | 3.52 | 23 | 1.38 | 70.89% | −1.18 |
| 8b-2 | Used Sweep Fluid | 1.81 | 23 | 6.12 | | 1.10 |
| 8c-1 | 12% D4 in PDMS; Stripped | 7.05 | 23 | 3.43 | 41.69% | −1.73 |
| 8c-2 | Used Sweep Fluid | 1.15 | 23 | 15.87 | | 1.81 |
| 8d-1 | 12% D4 in PDMS; Stripped | 9.61 | 23 | 9.59 | 20.51% | −2.38 |
| 8d-2 | Used Sweep Fluid | 0.56 | 23 | 45.12 | | 2.48 |
| 8e-1 | 12% D4 in PDMS; Stripped | 1.28 | 23 | 0.66 | 89.41% | −0.71 |
| 8e-2 | Used Sweep Fluid | 1.07 | 23 | 2.7 | | 0.29 |
| 8f-1 | 12% D4 in PDMS; Stripped | 1.88 | 23 | 0.87 | 84.45% | −0.89 |
| 8f-2 | Used Sweep Fluid | 2.34 | 23 | 3.68 | | 0.86 |
| 8g-1 | 12% D4 in PDMS; Stripped | 7.1 | 23 | 3.43 | 41.27% | −1.71 |
| 8g-2 | Used Sweep Fluid | 1.22 | 23 | 15.87 | | 1.92 |
| 8h-1 | 12% D4 in PDMS; Stripped | 3.34 | 23 | 1.38 | 72.37% | −1.21 |
| 8h-2 | Used Sweep Fluid | 1.92 | 23 | 6.12 | | 1.17 |
| 8i-1 | 12% D4 in PDMS; Stripped | 6.77 | 35 | 3.43 | 44.00% | −1.82 |
| 8i-2 | Used Sweep Fluid | 1.2 | 23 | 15.87 | | 1.89 |
| 8j-1 | 12% D4 in PDMS; Stripped | 8.1 | 38 | 5.48 | 33.00% | −2.19 |
| 8j-2 | Used Sweep Fluid | 0.91 | 23 | 25.62 | | 2.31 |
| 8k-1 | 12% D4 in PDMS; Stripped | 9.46 | 39 | 9.59 | 21.75% | −2.52 |
| 8k-2 | Used Sweep Fluid | 0.62 | 23 | 45.12 | | 2.75 |
| 8l-1 | 12% D4 in PDMS; Stripped | 3.82 | 22 | 1.38 | 68.40% | −1.14 |
| 8l-2 | Used Sweep Fluid | 1.86 | 16 | 6.12 | | 1.13 |
| 8m-1 | 12% D4 in PDMS; Stripped | 3.77 | 22 | 1.38 | 68.82% | −1.15 |
| 8m-2 | Used Sweep Fluid | 1.82 | 19 | 6.12 | | 1.11 |
| 8n-1 | 12% D4 in PDMS; Stripped | 7.47 | 35 | 3.43 | 38.21% | −1.58 |
| 8n-2 | Used Sweep Fluid | 1.05 | 14 | 15.87 | | 1.65 |
| 8o-1 | 12% D4 in PDMS; Stripped | 8.82 | 38 | 5.48 | 27.05% | −1.79 |
| 8o-2 | Used Sweep Fluid | 0.74 | 13 | 25.62 | | 1.87 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of separating a volatile siloxane from a liquid mixture, the method comprising:

contacting a first side of a first hydrophobic membrane with a liquid feed mixture comprising a polymer and at least one volatile siloxane, wherein the feed mixture is free of an organopolysiloxane emulsion; and contacting a second side of the membrane with a sweep medium comprising at least one of a sweep gas, a sweep liquid, and a vacuum, to produce a permeate mixture on the second side of the membrane and a retentate mixture on the first side of the membrane, wherein the permeate mixture is enriched in the volatile siloxane, and the retentate mixture is depleted in the volatile siloxane.

Embodiment 2 provides the method of Embodiment 1, wherein the retentate mixture is depleted in the volatile siloxane by about 1 wt % to about 99.9 wt %, as compared to the liquid feed mixture.

Embodiment 3 provides the method of any one of Embodiments 1-2, wherein the retentate mixture is depleted in the volatile siloxane by about 40 wt % to about 95 wt %, as compared to the liquid feed mixture.

Embodiment 4 provides the method of any one of Embodiments 1-3, wherein the liquid feed mixture has a temperature of about −40° C. to about 250° C.

Embodiment 5 provides the method of any one of Embodiments 1-4, wherein the liquid feed mixture has a temperature of about 50° C. to about 90° C.

Embodiment 6 provides the method of any one of Embodiments 1-5, wherein the first hydrophobic membrane is nonporous.

Embodiment 7 provides the method of any one of Embodiments 1-6, wherein the first hydrophobic membrane is a dense silicone membrane.

Embodiment 8 provides the method of any one of Embodiments 1-7, wherein the first hydrophobic membrane has a thickness of about 1 μm to about 300 μm.

Embodiment 9 provides the method of any one of Embodiments 1-8, wherein the first hydrophobic membrane is an unsupported membrane.

Embodiment 10 provides the method of any one of Embodiments 1-9, wherein the first hydrophobic membrane is a hollow fiber membrane module comprising a bundle of hollow fibers, wherein the fibers collectively have a bore-side and a shell-side, wherein at least one of the first side of the hollow fiber membrane is the bore-side and the second side of the hollow fiber membrane is the shell-side, and the first side of the hollow fiber membrane is the shell-side and the second side of the hollow fiber membrane is the bore-side.

Embodiment 11 provides the method of any one of Embodiments 1-10, wherein the sweep medium comprises a vacuum.

Embodiment 12 provides the method of any one of Embodiments 1-10, wherein the sweep medium is a sweep gas.

Embodiment 13 provides the method of any one of Embodiments 1-10, wherein the sweep medium is a sweep liquid.

Embodiment 14 provides the method of Embodiment 13, wherein the sweep liquid comprises an organosilicon fluid.

Embodiment 15 provides the method of Embodiment 14, wherein the organosilicon fluid comprises at least one of an organosiloxane and an organosilane.

Embodiment 16 provides the method of any one of Embodiments 14-15, wherein the organosilicon fluid comprises at least one silicon-bonded group chosen from a substituted or unsubstituted $(C_1-C_{20})$hydrocarbyl interrupted or terminated with 0, 1, 2, or 3 groups selected from —O—, —NH—, and —S—, substituted or unsubstituted $(C_1-C_{20})$alkyl, substituted or unsubstituted $(C_6-C_{20})$aryl, substituted or unsubstituted $(C_2-C_{20})$alkenyl, substituted or unsubstituted $(C_2-C_{20})$alkynyl, and a substituted or unsubstituted polyether.

Embodiment 17 provides the method of any one of Embodiments 1-16, further comprising desorbing the volatile siloxane from the permeate mixture and recirculating the desorbed permeate mixture into contact with the second side of the first hydrophobic membrane.

Embodiment 18 provides the method of Embodiment 17, wherein desorbing the volatile siloxane comprises contacting a first side of a second hydrophobic membrane with the permeate mixture and contacting a second side of the second hydrophobic membrane with a sweep medium.

Embodiment 19 provides the method according any one of Embodiments 11-18, wherein the feed mixture and the sweep medium flow in opposite directions.

Embodiment 20 provides the method according any one of Embodiments 11-19, wherein the feed mixture and the sweep medium flow radially to one another Embodiment 21 provides the method of any one of Embodiments 1-20, wherein the polymer of the liquid feed mixture is an organopolysiloxane.

Embodiment 22 provides the method of any one of Embodiments 1-21, wherein the volatile siloxane comprises at least one of a cyclosiloxane and a linear siloxane.

Embodiment 23 provides the method of Embodiment 22, wherein the cyclosiloxane is a substituted or unsubstituted cyclosiloxane having about 4 to 20 —Si—O— units in the ring or rings thereof.

Embodiment 24 provides the method of any one of Embodiments 22-23, wherein the cyclosiloxane is at least one of octamethyltetracyclosiloxane (D4) and decamethylpentacyclosiloxane (D5).

Embodiment 25 provides a method of separating a volatile siloxane from a liquid mixture, the method comprising:

contacting a first side of a first hydrophobic membrane with a liquid feed mixture comprising a polymer and at least one volatile siloxane, wherein the feed mixture is free of an organopolysiloxane emulsion, the first hydrophobic membrane comprises a dense silicone membrane having a thickness of about 1 µm to about 300 µm, and the liquid feed mixture has a temperature of about −40° C. to about 250° C.; and contacting a second side of the membrane with a sweep medium comprising at least one of a sweep gas, a sweep liquid, and a vacuum, to produce a permeate mixture on the second side of the membrane and a retentate mixture on the first side of the membrane, wherein the permeate mixture is enriched in the volatile siloxane, and the retentate mixture is depleted in the volatile siloxane by about 40 wt % to about 99 wt %, as compared to the liquid feed mixture.

Embodiment 26 provides a system for separating a volatile siloxane from a liquid mixture, the system comprising:

a first hydrophobic membrane;

a liquid feed mixture comprising a polymer and at least one volatile siloxane, the liquid feed mixture contacting a first side of the first hydrophobic membrane, wherein the feed mixture is free of an organopolysiloxane emulsion;

a sweep medium comprising at least one of a sweep gas, a sweep liquid, and a vacuum, the sweep medium contacting a second side of the membrane;

a permeate mixture on the second side of the membrane, the permeate mixture formed by the contacting, wherein the permeate mixture is enriched in the volatile siloxane;

a retentate mixture on the first side of the membrane, the retentate mixture formed by the contacting, wherein the retentate mixture is depleted in the volatile siloxane.

Embodiment 27 provides the apparatus or system of any one or any combination of Embodiments 1-26 optionally configured such that all elements or options recited are available to use or select from.

What is claimed is:

1. A method of separating a volatile siloxane from a liquid mixture, the method comprising:
   contacting a first side of a first hydrophobic membrane with a liquid feed mixture comprising a polymer and at least one volatile siloxane, wherein the feed mixture is free of an organopolysiloxane emulsion; and
   contacting a second side of the membrane with a sweep medium comprising at least one of a sweep gas, a sweep liquid, and a vacuum, to produce a permeate mixture on the second side of the membrane and a retentate mixture on the first side of the membrane, wherein the permeate mixture is enriched in the volatile siloxane, and the retentate mixture is depleted in the volatile siloxane.

2. The method of claim 1, wherein the retentate mixture is depleted in the volatile siloxane by about 1 wt % to about 99.9 wt %, as compared to the liquid feed mixture.

3. The method of claim 1, wherein the first hydrophobic membrane is nonporous.

4. The method of claim 1, wherein the first hydrophobic membrane is a dense silicone membrane.

5. The method of claim 1, wherein the first hydrophobic membrane has a thickness of about 1 µm to about 300 µm.

6. The method of claim 1, wherein the first hydrophobic membrane is an unsupported membrane.

7. The method of claim 1, wherein the first hydrophobic membrane is a hollow fiber membrane module comprising a bundle of hollow fibers, wherein the fibers collectively have a bore-side and a shell-side, wherein either
- the first side of the hollow fiber membrane is the bore-side and the second side of the hollow fiber membrane is the shell-side, or
- the first side of the hollow fiber membrane is the shell-side and the second side of the hollow fiber membrane is the bore-side.

8. The method of claim 1, wherein the sweep liquid comprises an organosilicon fluid comprising at least one of an organosiloxane and an organosilane.

9. The method of claim 8, wherein the organosilicon fluid comprises at least one silicon-bonded group chosen from a substituted or unsubstituted $(C_1-C_{20})$hydrocarbyl interrupted or terminated with 0, 1, 2, or 3 groups selected from —O—, —NH—, and —S—, substituted or unsubstituted $(C_1-C_{20})$alkyl, substituted or unsubstituted $(C_6-C_{20})$aryl, and a substituted or unsubstituted polyether.

10. The method of claim 1, further comprising desorbing the volatile siloxane from the permeate mixture and recirculating the desorbed permeate mixture into contact with the second side of the first hydrophobic membrane.

11. The method of claim 1, wherein the polymer of the liquid feed mixture is an organopolysiloxane.

12. The method of claim 1, wherein the volatile siloxane comprises at least one of a cyclosiloxane and a linear siloxane.

13. The method of claim 12, wherein the cyclosiloxane is a substituted or unsubstituted cyclosiloxane having about 4 to 20 —Si—O— units in the ring or rings thereof.

14. A method of separating a volatile siloxane from a liquid mixture, the method comprising:
- contacting a first side of a first hydrophobic membrane with a liquid feed mixture comprising a polymer and at least one volatile siloxane, wherein the feed mixture is free of an organopolysiloxane emulsion, the first hydrophobic membrane comprises a dense silicone membrane having a thickness of about 1 µm to about 300 µm, and the liquid feed mixture has a temperature of about −40° C. to about 250° C.; and
- contacting a second side of the membrane with a sweep medium comprising at least one of a sweep gas, a sweep liquid, and a vacuum, to produce a permeate mixture on the second side of the membrane and a retentate mixture on the first side of the membrane, wherein the permeate mixture is enriched in the volatile siloxane, and the retentate mixture is depleted in the volatile siloxane by about 40 wt % to about 99 wt %, as compared to the liquid feed mixture.

15. A system for separating a volatile siloxane from a liquid mixture, the system comprising:
- a first hydrophobic membrane;
- a liquid feed mixture comprising a polymer and at least one volatile siloxane, the liquid feed mixture contacting a first side of the first hydrophobic membrane, wherein the feed mixture is free of an organopolysiloxane emulsion;
- a sweep medium comprising at least one of a sweep gas, a sweep liquid, and a vacuum, the sweep medium contacting a second side of the membrane;
- a permeate mixture on the second side of the membrane, the permeate mixture formed by the contacting, wherein the permeate mixture is enriched in the volatile siloxane;
- a retentate mixture on the first side of the membrane, the retentate mixture formed by the contacting, wherein the retentate mixture is depleted in the volatile siloxane.

* * * * *